United States Patent
Zhao et al.

(10) Patent No.: US 8,787,316 B2
(45) Date of Patent: *Jul. 22, 2014

(54) MECHANISM FOR 3RD GENERATION PARTNERSHIP PROJECT MULTIPLE INTER-NETWORK QUALITY OF SERVICE CONTINUITY

(75) Inventors: Xiaoming Zhao, Irving, TX (US); Wei Wu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 366 days.

This patent is subject to a terminal disclaimer.

(21) Appl. No.: 13/336,798

(22) Filed: Dec. 23, 2011

(65) Prior Publication Data

US 2012/0165018 A1    Jun. 28, 2012

Related U.S. Application Data

(63) Continuation of application No. 12/487,446, filed on Jun. 18, 2009, now Pat. No. 8,085,731.

(60) Provisional application No. 61/073,742, filed on Jun. 18, 2008.

(51) Int. Cl.
   *H04W 4/00* (2009.01)
   *H04W 36/00* (2009.01)

(52) U.S. Cl.
   USPC ............................ 370/331; 455/436

(58) Field of Classification Search
   USPC ............................ 370/331; 455/436
   See application file for complete search history.

(56) References Cited

U.S. PATENT DOCUMENTS

2007/0019575 A1    1/2007  Shaheen

OTHER PUBLICATIONS

Examination Report issued in Australian Application No. 2009260005 on Nov. 22, 2012; 2 pages.
Office Action issued in Mexican Application No. MX/a/2010/014263 on Nov. 16, 2012; 3 pages.
Notice of Allowance issued in Korean Application No. 10-2012-7029046 on Jan. 25, 2013; 3 pages.
"3GPP TS 23.401 V.8.0.0 (Jun. 2008); 3rd Generation Partnership Project; Technical Specification Group Services and System Aspects" General Packet Radio Service (GPRS) Enhancements for Evolved Universal Terrestrial Radio Access Network (E-UTRAN) Access (Release 8); Jun. 9, 2008; 182 pages.
Notice of Acceptance issued in Australian Application No. 2009260005 on Oct. 22, 2013; 2 pages.
Office Action issued in Canadian Application No. 2,728,483 on Jul. 26, 2013; 3 pages.
Office Action issued in Chinese Application No. 200980131965.1 on Mar. 21, 2013; 10 pages.
Office Action issued in Chinese Application No. 200980131965.1 on Nov. 7, 2013; 5 pages.

(Continued)

*Primary Examiner* — Afshawn Towfighi
(74) *Attorney, Agent, or Firm* — Fish & Richardson P.C.

(57) ABSTRACT

A system to promote connectivity for inter-radio access technology (RAT) handover from a first radio access network (RAN) to a second radio access network (RAN) is provided. The system comprises a component configured such that for each access point name (APN) in communication with the first radio access network (RAN), the maximum bit rate (MBR) for each active non-guaranteed bit rate (non-GBR) bearer in the second radio access network (RAN) is determined based on each respective access point name's (APN's) used aggregate maximum bit rate (AMBR) and the number of active non-guaranteed bit rate(s) (non-GBR) bearers for the respective access point name (APN).

16 Claims, 12 Drawing Sheets

(56) References Cited

OTHER PUBLICATIONS

Office Action issued in Japanese Application No. 2012-011078 on May 10, 2013; 6 pages.
Notice of Allowance issued in Japanese Application No. 2012-011078 on Aug. 8, 2013; 3 pages.
Notice of Allowance issued in Korean Application No. 10-2012-7013067 on Mar. 7, 2013; 3 pages.
Office Action issued in Mexican Application No. MX/a/2013/001206 on Oct. 24, 2013; 3 pages.
"3GPP TS 23.401 V.8.0.0 (Dec. 2007); 3rd Generation Partnership Project; Technical Specification Group Services and System Aspects" General Packet Radio Service (GPRS) Enhancements for Evolved Universal Terrestrial Radio Access Network (E-UTRAN) Access (Release 8); 3GPP Organizational Partners; 2007; Part 1; 99 pages.
"3GPP TS 23.401 V.8.0.0 (Dec. 2007); 3rd Generation Partnership Project; Technical Specification Group Services and System Aspects" General Packet Radio Service (GPRS) Enhancements for Evolved Universal Terrestrial Radio Access Network (E-UTRAN) Access (Release 8); 3GPP Organizational Partners; 2007; Part 2; 68 pages.
Ericsson et al.; "AMBR per UE"; 3GPP TSG SA WG2 Meeting #64; Change Request-Rev. 3; Jeju Island, Korea; Apr. 7-11, 2008; 11 pages.
Ericsson et al.; "AMBR per UE"; 3GPP TSG SA WG2 Meeting #64; Change Request-Rev 4; Jeju Island, Korea; Apr. 7-11, 2008; 11 pages.
Ericsson et al.; "AMBR per UE"; 3GPP TSG SA WG2 Meeting #65; Change Request; Prague, Czech Republic; May 12-16, 2008; 19 pages.
Nokia Siemens Networks, Nokia; "Solutions for AMBR per UE"; 3GPP TSG SA WG2 Meeting #64b adhoc and #65; Munich, Germany; May 7-9, 2008; Prague, Czech Republic; May 12-16, 2009; 2 pages.
Research in Motion; "UE-AMBR Handling"; 3GPP TSG SA WG2 Meeting #68; Qingdao, China; Oct. 13-17, 2008; 8 pages.
Research in Motion; "Two Type Non-GBR AMBR & Non-GBR MBR QoS Mapping for I-RAT HO"; 3GPP TSG-SA2 Meeting #66; Change Request; Montreal, Canada; Jun. 23-27, 2008; 3 pages.
Samsung; "AMBR Modification Procedure"; 3GPP TSG-SA WG2 Meeting #62; Change Request; Marina del Rey, CA, US; Jan. 14-18, 2008; 12 pages.
Office Action issued in U.S. Appl. No. 12/487,446 on Feb. 4, 2011; 12 pages.
Office Action issued in U.S. Appl. No. 12/487,446 on Mar. 28, 2011; 14 pages.
Notice of Allowance issued in U.S. Appl. No. 12/487,446 on Aug. 29, 2011; 7 pages.
Communication under Rule 71(3) EPC issued in European Application No. 09767747.0 on Jul. 4, 2011; 54 pages.
International Search Report and Written Opinion of the International Searching Authority issued in International Application No. PCT/US2009/047824 on Sep. 14, 2009; 10 pages.
International Preliminary Report on Patentability issued in International Application No. PCT/US2009/047824 on Aug. 20, 2010; 12 pages.
Huawei; "AMBR Handling During HO from Release 7 GERAN/UTRAN to E-UTRAN" (S2-080130); 3GPP SA WG2 Architecture—S2#62; Change Request 23.401 CR 0024 Rev.; Marina Del Rey, California; Jan. 14-18, 2008; 8 pages.
Nortel, Huawei; "AMBR Handling during HO" (S2-080849); 3GPP TSG-SA Meeting #62; Change Request 23.401 CR097 Rev 1; Marina Del Rey, California; Jan. 14-18, 2008; 28 pages.
Extended European Search Report issued in European Application No. 11194951.7 on May 31, 2012; 6 pages.
Office Action issued in Korean Application No. 10-2011-7001332 on Mar. 20, 2012; 6 pages.
Office Action issued in Korean Application No. 10-2012-7013067 on Jul. 5, 2012; 6 pages.
Office Action issued in Mexican Application No. MX/a/2010/014263 on Apr. 27, 2012; 2 pages.
Notice of Allowance issued in Korean Application No. 10-2011-7001332 on Oct. 22, 2012; 3 pages.

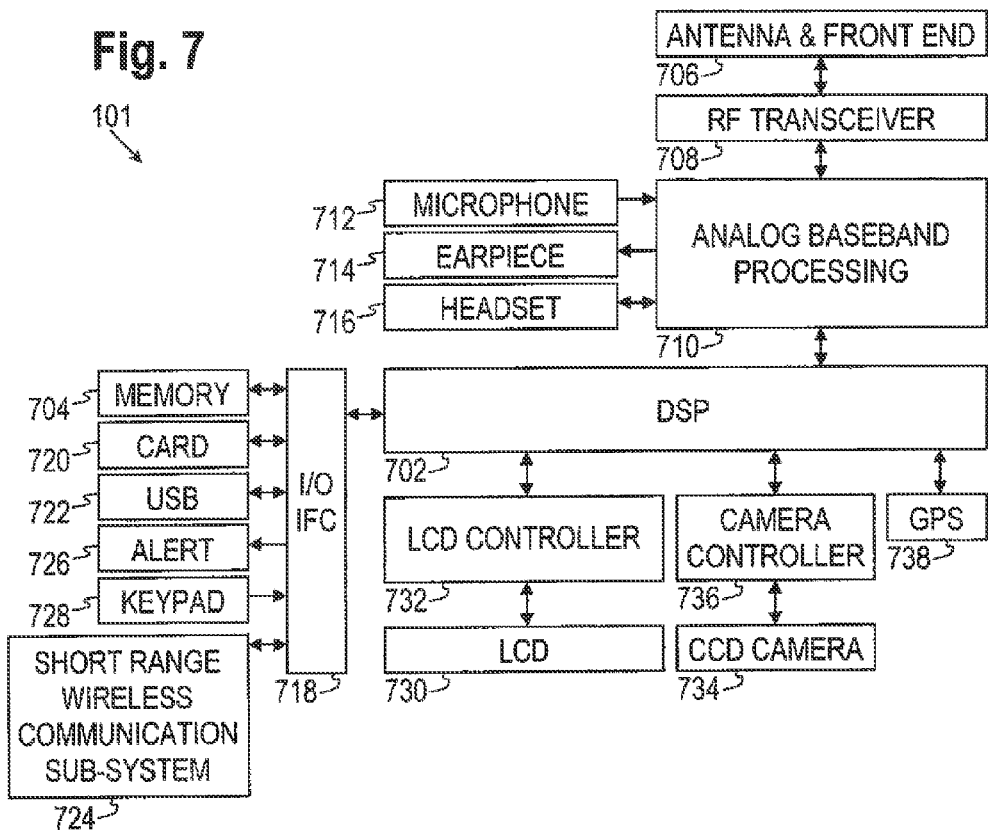
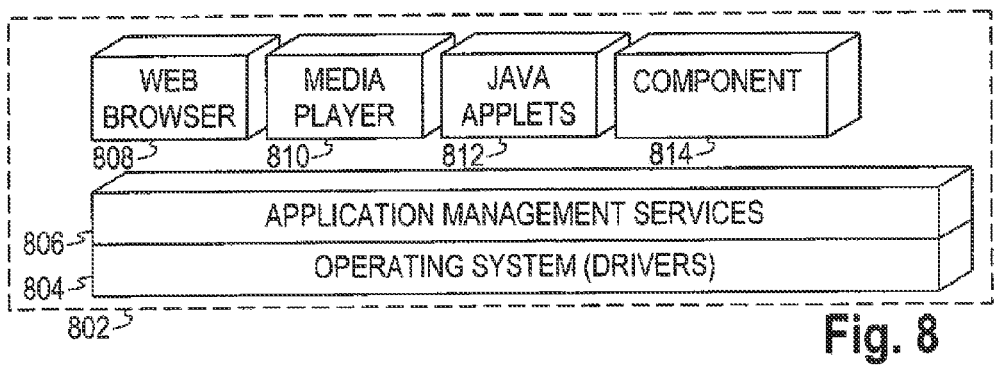

MECHANISM FOR 3RD GENERATION PARTNERSHIP PROJECT MULTIPLE INTER-NETWORK QUALITY OF SERVICE CONTINUITY

CROSS-REFERENCE TO RELATED APPLICATIONS

The present application is a continuation application of and claims priority to U.S. patent application Ser. No. 12/487,446, filed on Jun. 18, 2009, now U.S. Pat. No. 8,085,731 which claims priority to U.S. provisional patent application Ser. No. 61/073,742, filed Jun. 18, 2008, which is incorporated by reference herein as if reproduced in its entirety.

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as fixed line telephones, desktop computers, set-top boxes, or network nodes and therefore may also be referred to as user equipment "UE". When a UA is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE ENB that can provide a UA with access to other components in a telecommunications system.

For a wireless Voice over Internet Protocol (VoIP) call, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is a block diagram of a user agent operable for some of the various embodiments of the disclosure.

FIG. 8 is a diagram of a software environment that may be implemented on a user equipment operable for some of the various embodiments of the disclosure.

DETAILED DESCRIPTION

Figure 1:
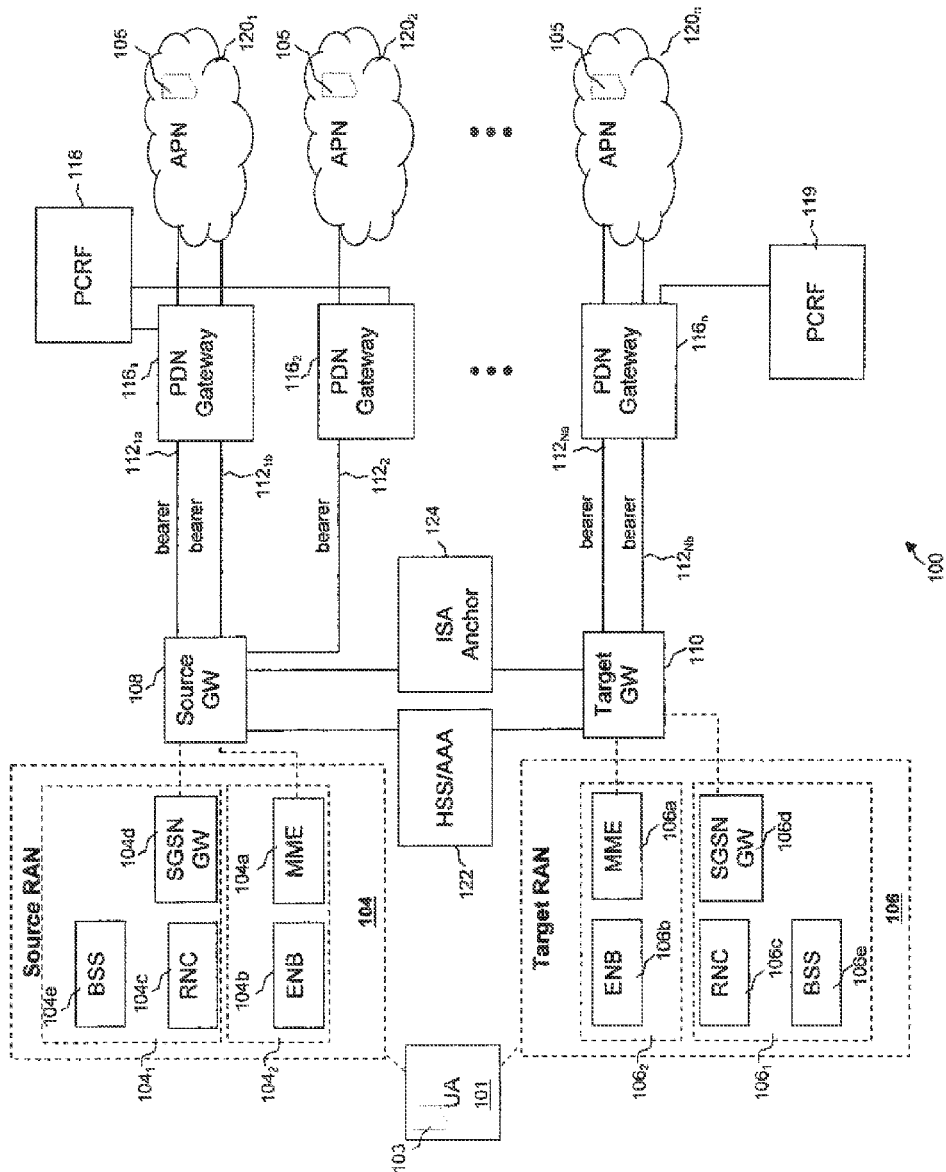
FIG. 1 is an illustration of a wireless telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system to promote connectivity for inter-radio access technology (RAT) handover from a first radio access network (RAN) to a second radio access network (RAN) is provided. The system includes a component configured such that for each access point name (APN), which may be the APN of that packet data network PDN, in communication with the first radio access network (RAN), the maximum bit rate (MBR) for each active non-guaranteed bit rate (non-GBR) bearer in the second radio access network (RAN) is determined based on each respective access point name's (APN's) used aggregate maximum bit rate (AMBR) and the number of active non-guaranteed bit rate(s) (non-GBRs) for the respective access point name (APN) of the PDN.

In an alternative embodiment, a method for inter-radio access technology (RAT) connectivity during a handover from a first radio access network (RAN) to a second radio access network (RAN) is provided. The method includes for each access point name (APN)), which may be the APN of that packet data network PDN, in communication with the first radio access network (RAN), determining the maximum bit rate (MBR) for each active non-guaranteed bit rate (non-GBR) bearer in the second RAN based on each respective access point name's (APN's) used aggregate maximum bit rate (AMBR) and the number of active non-guaranteed bit rate(s) (non-GBR)s for the respective access point name (APN) of the PDN.

In an alternative embodiment, a method for inter-radio access technology (RAT) connectivity during a handover from a first radio access network (RAN) to a second radio access network (RAN) is provided. The method includes for each access point name (APN) in communication with the first radio access network (RAN), the access point name (APN) aggregate maximum bit rate (AMBR) of each access point name (APN) in the second radio access network (RAN) is determined based on the sum of each respective access point name's (APN's) maximum bit rate (MBR) for each active non-guaranteed bit rate (non-GBR) bearer in the first radio access network (RAN). The method also includes a user agent (UA) aggregated maximum bit rate (AMBR) is determined based on the sum of all the respective access point names' (APNs') maximum bit rates for each active non-guaranteed bit rate (non-GBR) bearer in the first radio access network (RAN).

In an alternative embodiment, a system to promote connectivity for inter-radio access technology (RAT) handovers from a first radio access network (RAN) to a second radio access network (RAN) is provided. The system includes a component configured such that for each access point name (APN) in communication with the first radio access network (RAN), the access point name (APN) aggregate maximum bit rate (AMBR) of each access point name (APN) in the second radio access network (RAN) is determined based on the sum of each respective access point name's (APN's) maximum bit rate (MBR) for each active non-guaranteed bit rate (non-GBR) bearer in the first radio access network (RAN), and further such that a user agent (UA) aggregated maximum bit rate (AMBR) is determined based on the sum of all the respective access point names' (APNs') maximum bit rates for each active non-guaranteed bit rate (non-GBR) bearer in the first radio access network (RAN).

The wireless domain services for both voice and data have greatly evolved to include broadband, high speed, and multimedia services using different radio access technologies (RATs) such as UMTS, GPRS, Enhanced Data rates for Global Evolution (EDGE), and 3GPP-LTE. To satisfy end user service demands with the technologies that have historically evolved, an operator may deploy multiple radio access networks in the same geophysical locations, fully or partially overlaid. There may also be cases in which different operators share the same radio access network with the same or different radio frequencies. For inter-RAT/inter-network systems, operators may wish to support inter-working functionality that allows UAs to camp in or hand over to different RATs according to the service needs of the UAs, radio conditions, and network load balancing considerations.

Within any of these RATs and RANs, the ability to support scheduling and prioritization of calls, data packets, data streams, bearer traffic, and other network events are useful. These events and their management may be referred to as quality of service (QoS), which promotes differing priorities to various applications, user agents, data flows, data packets, or to guarantee a selectable level of performance to a flow of data. For example, a required bit rate, a delay, packet dropping probability, and/or bit error rate may be "guaranteed" or agreed upon by provider. QoS commitments may be challenging to meet if, for example the network capacity is insufficient or other network issues exist.

An example illustrating one issue related to QoS includes, for example, a user agent on a mobile device operating in a UTRAN/GERAN (Evolved Universal Terrestrial Radio Access Network/global system for mobiles (GSM) enhanced data for GSM evolution (EDGE) radio access network) technology based network. In a data transaction the user agent operating on the mobile phone may be handed off to a "new" more advanced technological radio network such as the Evolved Universal Terrestrial Radio Access Network (E-UTRAN). During the handoff, the user of the mobile device may experience a loss in service or a loss of data. This disruption can be caused by of one or more incompatibilities between the networks, such as the manner in which the QoS services are managed and maintained by networks. The disruption may be caused by a mishandling of the bearer traffic, more specifically non-guaranteed bit rates (non-GBRs) bearer traffic and associated quality of service (QoS) parameters which include used aggregated maximum bit rate(s) (AMBR) associated with the user agent (UA). The AMBR associated with the UA-to-access device communication may be also referred to as a UA-AMBR or UE-AMBR, and the AMBR associated with the access point name (APN) communication may be referred to as the APN-AMBR. The APN-AMBR may be described as the maximum allowed bit rate of the all the bearers of the respective APN. Current mechanisms for handling of these non-GBR bearer(s) and QoS parameters during handovers may result in these disruptions.

A standardized mechanism to effectively manage the continuity of the quality of services to a user agent (UA) might be of assistance in some instances. The present disclosure contemplates a mechanism that standardizes incompatibilities in the handling of the non-GBR UA-AMBRs and APN-AMBRs during the handover of the UA between differing radio access network (RAN) and other network system technologies. Specifically, E-UTRAN has UA-AMBR and APN-AMBR, while UTRAN/GERAN does not support AMBR for non-GBR bearers. The present disclosure provide for QoS mapping to address these incompatibilities during a handover.

Turning now to FIG. 1, illustrated is an embodiment of two radio access networks (RANs) in which inter-working functionalities are provided. FIG. 1 is exemplary and may have other components or arrangements in other embodiments. A source RAN 104 and a target RAN 106 each using one or more technologies such as GPRS/EDGE, UMTS, 3GPP LTE, WLAN, WiMAX, CDMA 2000, and/or other current or future technologies. Internet protocols (IP) IPV4, IPV6, and/or other current or future protocols may be supported by these technologies. Geographically, the source RAN 104 and the target RAN 106 might be intersected and/or overlaid. In addition, the source RAN 104 and the target RAN 106 may be serviced by any or a combination of Internet Protocol-based networks, packet-based networks, public switched telecom networks (PSTN), and/or integrated services digital networks.

The source RAN 104 and the target RAN 106 may each include the RANs 104$_1$, 104$_2$, 106$_1$, or 106$_2$ dependent upon the configuration of the communications technology being described during the handover. For example, the RANs 104$_1$ and 106$_1$ may include UTRAN, UTRAN/GERAN, or GERAN based technology, and the RANs 104$_2$ and 106$_2$ may include E-UTRAN based technology. It will be appreciated that both systems, i.e. 104$_1$ and 104$_2$, may not in fact exist within the same network, i.e. the source RAN 104, simultaneously. The RANs 104$_2$ and 106$_2$ each include an access device or ENB 104b and 106b and a mobility management entity (MME) 104a and 106a in communication with a source gateway 108 and a target gateway 110 each in communication through bearers 112$_{1-N}$ or signaling connections to packet data network (PDN) gateways 116$_{1-n}$. The RANs 104$_1$ and 106$_1$ each include a radio network component (RNC) 104c and 106c, a serving general packet radio service (GPRS) support node gateway (SGSN GW) 104d and 106d, a base station subsystem (BSS) 104e and 106e, a base station component or other network components. In an embodiment, the SGSN SW 104d and 106d are in communication with the source gateway 108 and the target gateway 110 each in communication through bearers 112$_{1-N}$ or signaling connections to packet data network (PDN) gateways 116$_{1-n}$. The (PDN) gateways 116$_{1-n}$ are connected to APNs 120$_{1-n}$ which may include packet based services such as World Wide Web pages, multimedia broadcasting/multicast services, and other data packet-based services.

It should be noted that the lines connecting the elements in the drawing can represent bearer connections, signaling connections, or both. Traditionally, a different style of line is used to represent each type of connection. However, for the sake of clarity in the drawing, bearer connections and signaling connections are both represented by solid lines in FIG. 1. The dashed lines connecting the UA 101 to the source RAN 104 and the target RAN 106 are intended to represent the fact that the UA 101 might be connected to the source RAN 104 at a first time and to the target RAN 106 at a second time via the air interface or other media interface.

A home subscriber server (HSS) or an authentication, authorization and accounting (AAA) server 122 stores policy and tracking/location information for subscribers to a wireless telecommunications service. A logical inter-access system (IAS) anchor 124 terminates IP access service and manages inter-system IP service termination, inter-system routing and billing, and IP bearer services. Physically, the IAS anchor 124 could be collocated with a gateway or elsewhere. The source RAN 104 and the target RAN 106 are typically furnished with multiple radio channel resources. Each RAN 104 and 106 measures its radio channel resources and reports the utilization of its radio channel resources to its respective gateway 108 and 110, which then pass this information on to the IAS anchor 124 via various protocols.

In an embodiment, HSS/AAA server 122, or a similar component, can connect to the source MME 104a or the target MME 106a and can store data related to services available to the UA 101, quality of service (QoS) policies for the UA 101, and other similar UA profile data. If dynamic policy and charge control (PCC) rules are to be deployed in the system 100, a policy control and charging rules function (PCRF) 118 and 119, or a similar component, might be present. The PCRF 118 and 119 can connect to the source and target gateway(s) 108 and 110, the PDN gateway 116$_{1-n}$, and/or the APNs 120$_{1-n}$ for an operators IP services, and can store and enforce policies related to the connections between the source and target gateway(s) 108 and 110 and the PDN gateway 116$_{1-n}$. Although source and target gateways 108 and 110 are shown connected to certain of the PDN gateways 116, it will be appreciate that gateways 108 and 110 may connect, directly or indirectly, to communicate with any of the PDN gateways PDN gateway 116$_1$, PDN gateway 116$_2$, PDN gateway 116$_n$.

In communication with the source RAN 104 and/or the target RAN 106 is a user agent (UA) 101. In an embodiment, the source RAN 104 connects to at least one radio access cell by which the source RAN 104 provides services to the UA 101 via an air interface. In some embodiments, the UA 101 and/or the RAN 104 and 106 may obtain channel and other measurement information that may include a quality of service (QoS) parameter 103 such as an aggregated maximum bit rate (AMBR) or a maximum bit rate (MBR). The APN 120$_{1-n}$ may each also include a corresponding QoS parameter 105. The parameters 103 and 105 may include a total bandwidth available to be shared among all the non-GBR bearers 112$_{1-N}$ between the UA 101, the source ENB 104b, the target ENB 106b, and the APNs 120$_{1-n}$. The QoS parameters 103 and 105 might be located or shared with systems other than only the UA 101 and APNs 105, respectively, as shown.

In some instances, the UA 101 may connect to a plurality of PDN gateway 116$_{1-n}$ concurrently via for example the ENB 106b, the target gateway 110, and the plurality of bearer 112$_{1-N}$. Based on the UAs' 101 quality of service (QoS) profiles, the bearers 112$_{1-N}$ may conform to a set of quality of service requirements, such as a guaranteed bit rate (GBR), a maximum bit rate (MBR), a packet delay budget (PDB), and other parameters of data transfer quality.

Bearer traffic (represented by the bearers 112$_{1-N}$) can be classified into two categories: Guaranteed Bit Rate (GBR) and non-Guaranteed Bit Rate (non-GBR). On a GBR bearer, a specified bandwidth is reserved and remains available as long as the bearer remains in place. A GBR bearer might be established for services with large bandwidth requirements, such as streaming video. Services such as email that have more flexible bandwidth requirements might use non-GBR bearers, for which a specified bandwidth is not reserved.

For non-GBR bearers of a UA in an EUTRAN/EPC system, QoS can be enforced by a QoS Class Indicator (QCI), an Allocation and Retention Priority (ARP), and an Aggregated Maximum Bit Rate (AMBR). The QCI, ARP, and AMBR are typically stored in the UA's QoS profile. When the UA 101 attaches to the network via for example the RAN 104$_2$ or 106$_2$, the source or target MME 104a and 106b can retrieve these parameters from the HSS 122 and send them to the source or target ENB 104b and 106b or the UA for downlink/uplink QoS enforcement between the UA and ENB and the PDN gateway(s) 116$_1$ and 116$_n$, or the PCRF 118 and 119 for downlink/uplink QoS enforcement.

The AMBR may be a fixed value that provides a limit to the total bandwidth provided for non-GBR traffic to the ENB 104b and 106b or to the APNs 120$_{1-n}$. For example, the HSS 122 may store the AMBR of the UA 101 as a subscribed static value. The UA-AMBR assigned to the UA may be referred to as the subscribed UA-AMBR or just UA-AMBR. The APN-AMBR associated with the UA for a subscribed PDN might also be included in the terms subscribed APN-AMBR and APN-AMBR. A UA with multiple PDN subscriptions may be associated with multiple APN-AMBRs, one for each subscribed PDN. Since the bandwidth that is actually available at the ENB 104b and 106b or at the APN 120$_{1-n}$ might change in real time and might be greater than or less than the bandwidth specified in the AMBR, a static AMBR may not optimally utilize the real-time bandwidth availability under non-GBR QoS enforcement.

As noted above, the present disclosure relates to issues that may arise in relation to maintaining continuity of the quality of service (QoS) parameter 103 and 105 of the UA 101 and the APN $120_{1-n}$ such as a maximum but rate (MBR) or an aggregated maximum bit rate (AMBR) during an inter-RAT/inter-network handover. The network technology may include E-UTRAN, UTRAN, GERAN, UTRAN/GERAN, and/or other technologies.

E-UTRAN to UTRAN/GERAN Inter-RAT Handover

A UA 101 may switch between networks for various reasons including but not limited to improve coverage, bandwidth availability, load balancing, or other reasons. In some instances where the source RAN 104 may include a E-UTRAN based network and the target RAN 106 may include a UTRAN/GERAN based network the inter-RAT/inter-network handover preparation of the UA 101 may require additional operations to maintain QoS continuity. For example, to maintain continuity it may be useful to map the AMBR of the APN $120_{1-n}$ associated with the source RAN $104_2$ into an MBR associated with the target RAN $106_1$. As mentioned earlier, E-UTRAN has UA-AMBR and APN-AMBR, but UTRAN/GERAN does not support AMBR for non-GBR bearers.

The present disclosure provides for QoS mapping between components in these networks. This may include, for example, mapping the AMBR of APN $120_1$ in the source network to the MBRs of all the active non-GBRs connected to the APN $120_n$ in the target network. When the source network 104 is an EUTRAN network, the AMBR for an APN, such as APN $120_1$, is the maximum allowable bit rates of the all the relative bearers, such as bearers $112_1$, and $112_{2b}$. When the target RAN 106 is a UTRAN/GERAN such as the RAN $106_1$, the MBRs are mapped for each active non-GBR bearer, such as bearers $112_{Na}$ and $112_{Nb}$, of the target APN, such as APN $120_n$. In this case, the MBRs of each active non-GBR, bearers $112_{Na}$ and $112_{Nb}$, of APN $120_n$ in the target network 106 will be configured to be the AMBR of the active APN $120_1$ in the source network 104 divided by N, where N represents the total sum of active non-GBRs bearers connected to each of the APN $120_n$. While this allocation is proportional, in other embodiments, allocation of MBRs to the active non-GBR bearers might not be proportionate and some non-GBR bearers might be allocated more or fewer MBRs than others. For, example, the MBR may be allocated to the bearer $112_2$ of the PDN gateway $116_2$ and the $APN_2$. Other allocations will readily suggest themselves to one skilled in the art. The above described mappings may be repeated for all active APNs where the source and target RANs 104, 106 support multiple PDN connectivity.

Where the target RAN 106 does not support more than one of the APNs $120_n$, then only the AMBR parameters for the default APN $120_1$ (or perhaps another PDN) in the source network 104 may be selected for mapping to the MBRs of the non-GBR bearers in the target network 106. It may be the case that only the default APN is connected to the target RAN. The AMBRs of other APNs in the source network might then be ignored.

UTRAN/GERAN to E-UTRAN Inter-RAT Handover

In other instances where the source RAN 104 may include UTRAN/GERAN based network (or the RAN $104_1$) and the target RAN 106 may include E-UTRAN (the RAN $106_2$), the inter-RAT/inter-network handover preparation of the UA 101 may be somewhat different than described above. Maintaining the continuity of the QoS includes mapping the MBRs associated one or more of the APN $120_1$ in the source RAN 104 to the AMBR associated with the APN $120_n$ that are compatible with the target RAN 106. The MBRs may include one or more active non-GBRs. The AMBR of the APN, such as APN $120_n$, of the target RAN 106 is set to the sum of the MBRs of all the active non-GBRs connected to the APN, APN $120_1$, in the source network 104. In some embodiments, the mapping or allocations may not be proportional between the source and target networks 104 and 106. For example, the sum of the MBRs of all the active non-GBRs connected to the APN in the source network 104 might be greater or less than the AMBR allocated to the APN in the target RAN 106. Once the AMBR of the APN $120_n$ in the target RAN 106 is determined, the handover may commence by the MME 104a, or other systems in other embodiments, updating the ENB 106b and the gateways 108 and 110 or PDN gateways 116 based upon quality of service (QoS) policies for the UA 101 from the HSS/AAA 122.

Examples of procedures for QoS AMBR handling during inter-RAT/inter-network preparation mentioned above are further presented in flow diagrams 200, 300, 400, and 500 of FIGS. 2 through 5, with reference to 3GPP S2-084350, 3GPP TS23.401, 3GPP TS23.402, and 3GPP TS23.236, which are incorporated herein by reference for all purposes. It is to be understood that the following discussion are examples of 3GPP or other inter-RAT handover procedure enhancements for non-GBR AMBR handling and are not to be limited.

Figure 2:
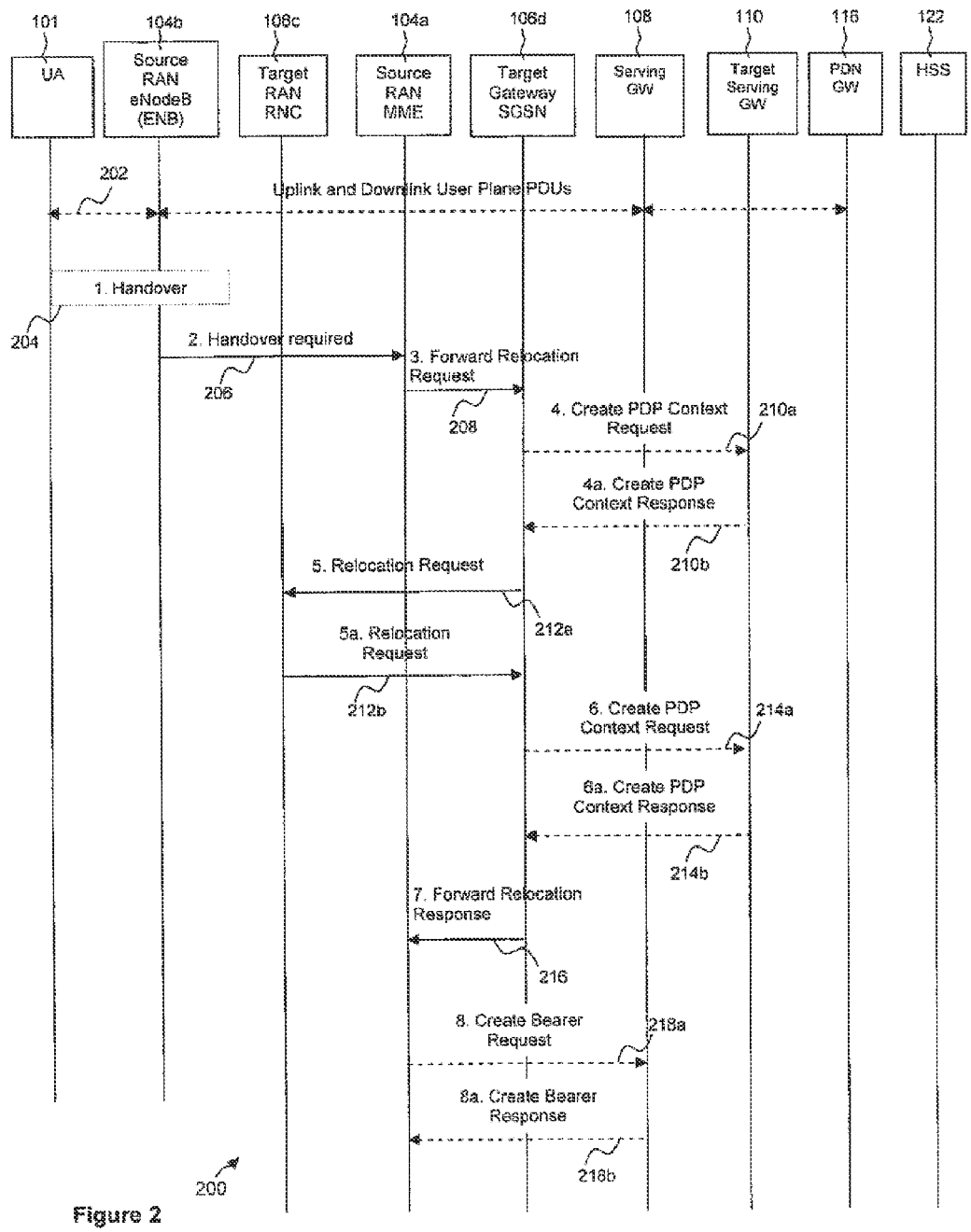
FIG. 2 is a flow diagram according to an embodiment of the disclosure.

FIG. 2, illustrates an example of a EUTRAN to UTRAN handover preparation procedure. At event 202, uplink and downlink packet data units (PDUs) distribute amongst the UA 101, the ENB 104b, the RNC 106c, the MME 104a, the SGSN gateway 106d, the source serving gateway 108, the target serving gateway 110, and the PDN gateway $116_{1-n}$ are exchanged. At event 204, handover preparation commences of the UA 101 from the source RAN 104 to the target RAN 106. The source ENB 104b acknowledges the UA 101 and profile information and QoS profile of the UA 101 is determined. Once the UA 101 is acknowledged, at event 206 the source ENB 104b communicates with the source MME 104a which also acknowledges the existence and QoS parameter(s) of the UA 101.

At event 208, the source MME 104a may map one-to-one the EPS (evolved packet system) bearer(s), such as EUTRAN bearers, to PDP (packet data protocol) context(s), such as UTRAN QoS parameters, and sequentially maps EPS QoS parameters associated with an EPS bearer to QoS parameters of the PDP context(s). The PDP context(s) are then used to determine a prioritization order. Where more than one APN $120_{1-n}$ is present in the target RAN 106 (or RAN $106_1$), QoS mapping is determined for each active non-GBR bearers associated with each of the APN $120_{1-n}$. The MBRs to be employed by the target SGSN gateway 106d and the target RNC 106c may be set to be equal to the AMBR of the APN $120_{1-n}$ divided by the number of active non-GBRs. In some embodiments, the MBRs may each have unique values such that the sum of the MBRs may be equal to the total number of used APN-AMBR. Of course, if the target RAN 106 can only support one of the APN $120_{1-n}$, then a specific bearer associated with the APN $120_{1-n}$ may be connected to the target RAN 106.

At event 210a and 210b, a PDP request and response are exchanged between the target SGSN gateway 106d and the target serving gateway 110 to communicate the mapping of the MBRs to the AMBRs via IP packet data. At event 212a and 212b, a relocation request and response are exchanged between the target RNC 106c and the SGSN gateway 106d, and by another PDP request and response exchange between the target SGSN gateway 106d and the target serving gateway 110 at event 214a and 214b.

At event 216, 218a, and 218b, the relocation response associated with the UA 101 is sent from the SGSN gateway 106d to the source MME 104a, and a bearer request and response are exchanged between the source MME 104a and the serving source gateway 108.

Figure 3:
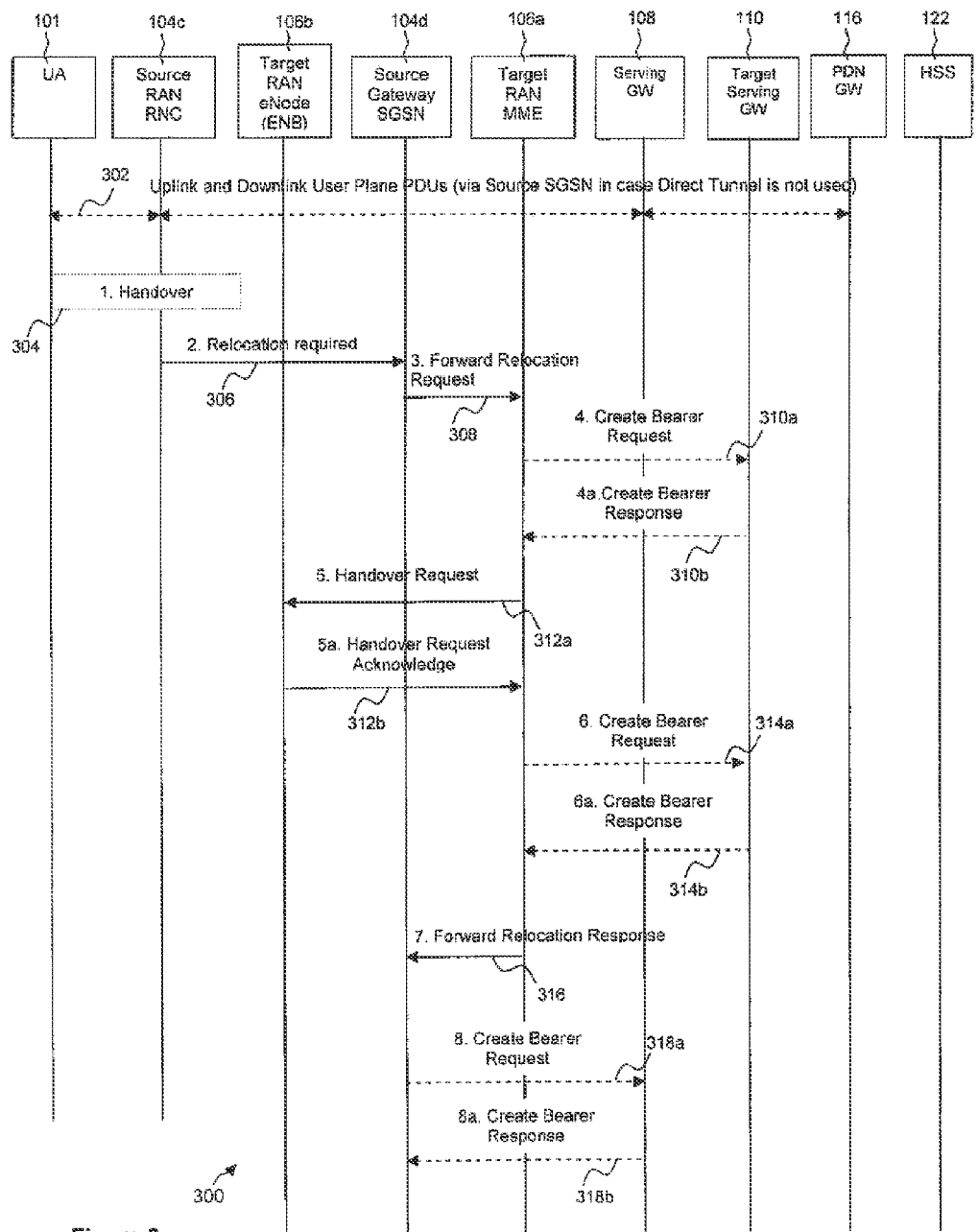
FIG. 3 is a flow diagram according to an embodiment of the disclosure.

FIG. 3 illustrates an example of a UTRAN to E-UTRAN inter-RAT handover preparation. At event 302, uplink and downlink packet data units (PDUs) distribute amongst the UA 101, the ENB 106b, the RNC 104c, the MME 106a, the SGSN gateway 104d, the source serving gateway 108, the target serving gateway 110, and the PDN gateway $116_{1-n}$ are exchanged. At event 304, handover preparation commences of the UA 101 from the source RAN 104 (RAN $104_1$) to the target RAN 106 (RAN $106_2$). The source RNC 104c acknowledges the UA 101 and profile information and QoS profile of the UA 101 is determined. Once the UA 101 is acknowledged, at event 306 the source RNC 104c communicates with the source SGSN gateway 104d that the UA 101 is initiating a handover to map an associated QoS parameter.

At event 308, the source SGSN gateway 104d sends the relocation request to the target MME 106a. The target MME 106a maps the PDP contexts to the EPS bearers and values associated with the QoS parameter to the PDP context to the EPS QoS parameter values of the EPS bearer. In some embodiments, the target MME 106a may terminate certain EPS bearers that may not be able to be established. Moreover, it is to be understood that the target ENB 106b may require both the AMBR associated with the UA and the APN $120_{1-n}$ for enforcing QoS of the UA 101 between the source RAN 104 and the target RAN 106. The UE-AMBR and the APN-AMBR may be set according to APN-AMBR of each active of the APN $120_{1-n}$ equal to the sum of the MBRs of the active non-GBRs, and the UE-AMBR equal to the sum of all MBRs associated with active non-GBRs associated with the source RAN 104.

At event 310a and 310b, a bearer request and response are exchanged between the target MME 106a and the serving target gateway 110, subsequently followed by a handover request and acknowledgement between the target MME 106a and the target ENB 106b at event 312a and 312b. In an embodiment, the target MME 106a requests the target ENB 106b to establish bearers by sending the handover request. The a handover request may include one or more UE identifier(s), Cause, $K_{eNB}$, an allowed AS Integrity Protection and Ciphering algorithm(s), and/or a KSI and key derivation parameters. In addition, the handover may also include the mapped QoS parameters for each of the APN $120_{1-n}$ including the used or dynamic UE-AMBRs and the APN-AMBRs from the source RAN 104 to the target RAN 106.

At event 314a and 314b, a bearer request and response are established between the serving target gateway 110 and the target MME 106a, followed by the relocation response being sent to the source SGSN gateway 104d from the target MME 106a at event 316. A bearer request and response are exchanged between the source SGSN gateway 104d and the serving source gateway 108 at event 318a and 318b.

Figure 4:
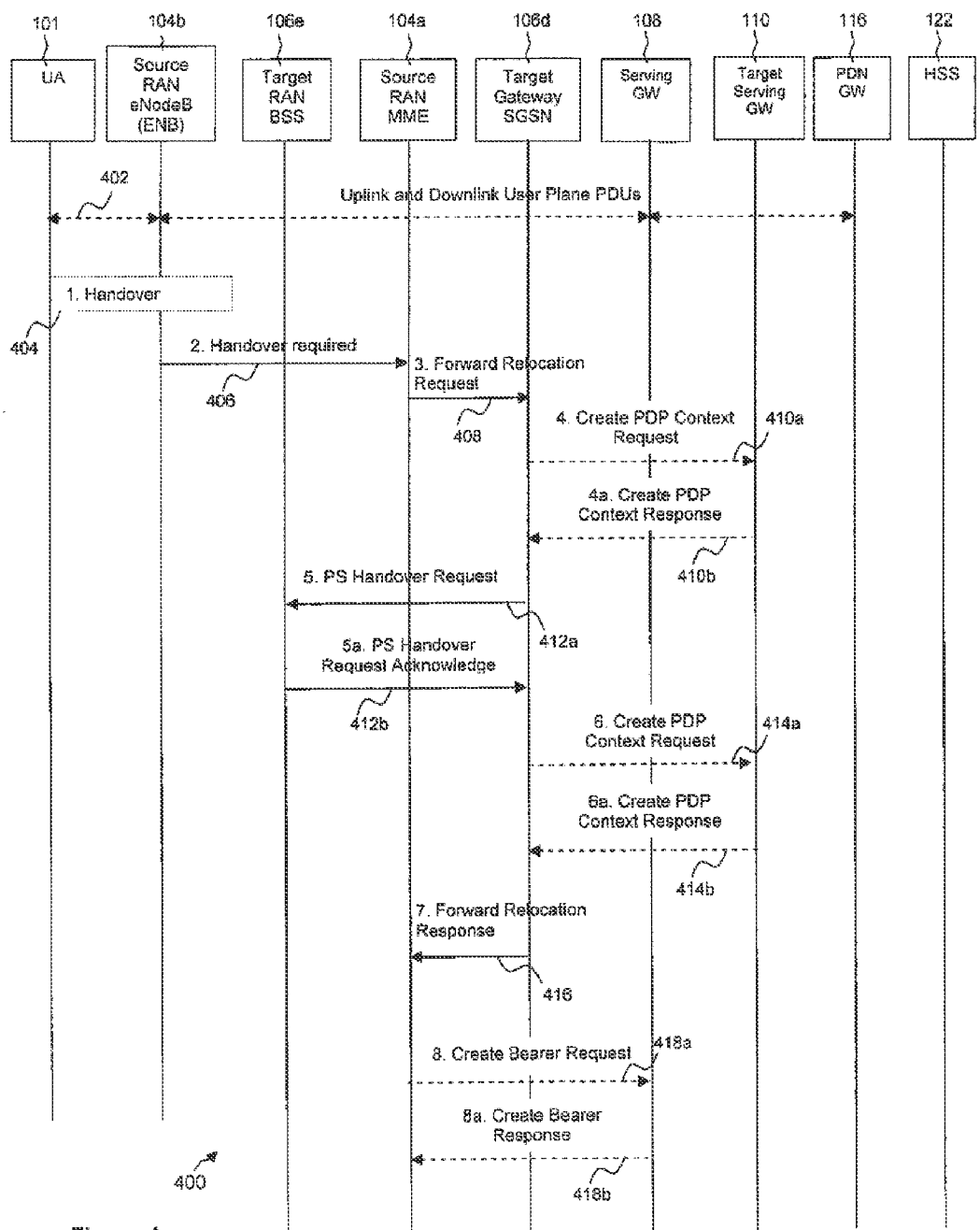
FIG. 4 is another flow diagram according to an embodiment of the disclosure.

FIG. 4 illustrates an example of E-UTRAN to GERAN A/GB mode inter-RAT handover preparation. At event 402, uplink and downlink packet data units (PDUs) distribute amongst the UA 101, the ENB 104b, the BSS 106e, the MME 104a, the SGSN gateway 106d, the source serving gateway 108, the target serving gateway 110, and the PDN gateway $116_{1-n}$ are exchanged. At event 404, handover preparation commences of the UA 101 from the source RAN 104 to the target RAN 106. The source ENB 104b acknowledges the UA 101 and profile information and QoS profile of the UA 101 is determined.

At event 406 the source ENB 104b communicates with the source MME 104a that the UA 101 is initiating a handover to map an associated QoS parameter. In an embodiment, at event 408, the source MME 104a maps the EPS bearers to the PDP contexts and values associated with the EPS QoS parameter of an EPS bearer to pre-determined QoS parameter values of another pre-determined PDP context. The PDP contexts are prioritized in order from highest to lowest importance PDP context(s). In one embodiment, if there are more than one APN $120_{1-n}$ support capability present in the target RAN 106, then for each of the active one or more of the APN $120_{1-n}$ all of the associated bearer connections will be connected to the target RAN 106. For each of the active non-GBR bearers associated with the one or more APN $120_{1-n}$, the MBRs of an active APN employed in the SGSN target gateway 106d of the target RAN 106 may be equal to the used APN-AMBRs of that APN divided by N, wherein N includes the number of active non-GBR bearers in that APN $120_{1-n}$. In some embodiments, the MBRs of an active APN may include a myriad of values such that the sum of the MBRs may equal to the used APN-AMBR. If multiple APN $120_{1-n}$ are not supported by the target RAN 106, then only the "default" APN $120_1$ bearer connections associated with the source RAN 104 may be connected to the target RAN 106.

At event 410a and 410b, PDP context requests and responses are exchanged between the target SGSN gateway 106d and the target serving gateway 110, followed by a PS handover request and acknowledgement between the target SGSN 106d and the target BSS 106e at events 412a and 412b. After the PS handover exchange, PDP context requests and responses are exchanged at events 414a and 414b between the target SGSN gateway 106d and the target serving gateway 110, and the relocation is forwarded from the target SGSN gateway 106d to the source MME 104a. A relocation request is sent to the source MME 104a from the target SGSN gateway 106d at event 416. Bearer request(s) and response(s) are then exchanged between the source MME 104a and the serving source gateway 108 at event 418a and 418b.

Figure 5:
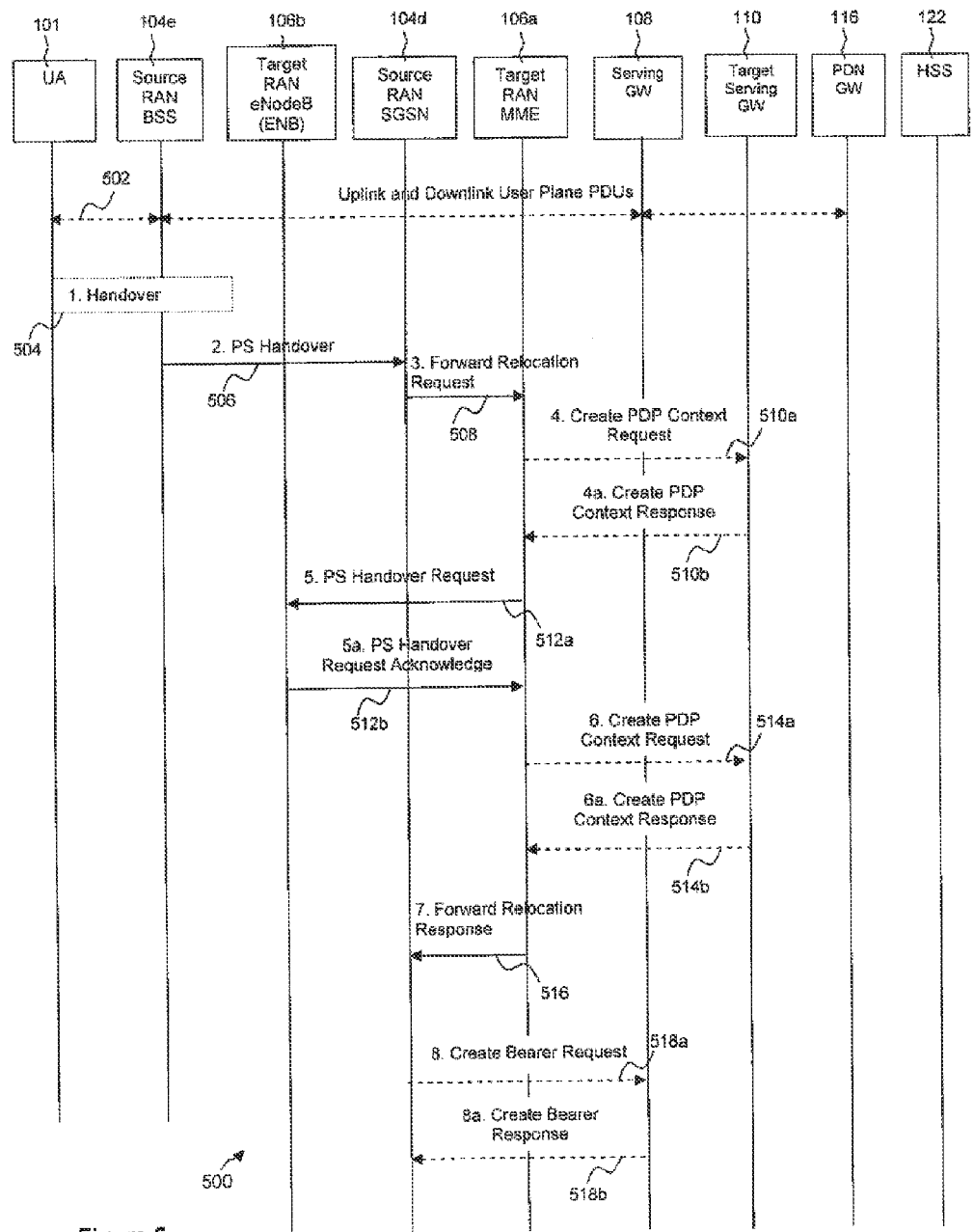
FIG. 5 is another flow diagram according to an embodiment of the disclosure.

FIG. 5 illustrates an example of GERAN A/Gb mode to E-TRAN inter-RAT handover preparation. At event 502, uplink and downlink packet data units (PDUs) distribute amongst the UA 101, the ENB 106b, the BSS 104e, the MME 106a, the SGSN gateway 104d, the source serving gateway 108, the target serving gateway 110, and the PDN gateway $116_{1-n}$ are exchanged. At event 504, handover of the UA 101 preparation commences from the source RAN 104 to the target RAN 106. The source BSS 104e acknowledges the UA 101 and profile information and QoS profile of the UA 101 is determined. Once the UA 101 is acknowledged, at event 506 the source BSS 104e communicates with the source SGSN gateway 104d that the UA 101 is initiating a PS handover to map an associated QoS parameter.

At event 508, the source SGSN gateway 104d forwards a relocation request to the target MME 106a. In an embodiment, the request includes a 'Direct Forwarding Flag' IE that may be set by the source SGSN gateway 104d, that indicates whether or not Direct Forwarding of data to the target RAN 106 is to be employed for the mapping of QoS parameters, such as the AMBRs associated with the UA 101 and the APN $120_{1-n}$. The target MME 106a then maps the PDP context to the EPS QoS parameter values associated with an EPS bearer. The target MME 106a establishes the EPS bearer(s) in a determined prioritize manner. In some embodiments, the target MME 106a may deactivate the EPS bearers that may not be able to be established in the target RAN 106.

At event 510a and 510b, PDP context requests and responses are exchanged between the target MME 106a and the target serving gateway 110, followed by a PS handover request and request acknowledgement between the target MME 106a and the target ENB 106b at events 512a and 512b.

In an embodiment, the target MME 106a may request the target ENB 106b to establish bearer(s) by sending the handover request. The handover request may include a UA Identifier, Cause, Integrity protection information and associated IK or Integrity Protection algorithms, Encryption information such as CK and allowed Ciphering algorithms, EPS Bearers to be setup list, and Source to Target Transparent Container. In some embodiments, the target MME 106a may not request resources for which an activity status indicator within a PDP context indicates no active bearers from the source RAN 104. For each EPS bearer requested to be established, the EPS may include information such as ID, bearer parameters, Transport Layer Address, and S1 Transport Association. The transport layer Address may include the source serving gateway 108 address associated with user data of the UA 101, and the S1 Transport Association may correspond to an uplink Tunnel Endpoint Identifier Data. The ciphering and integrity protection keys may be transparently sent from the target ENB 106b to the UA 101 using for example, the Target to Source Container, and also in the message PS handover command from the source BSS 104e to the UA 101 to allow data transfer in the source RAN 106 without requiring additional authentication and key agreement procedures. In some instances, each of the APN $120_{1-n}$ connected to the target RAN 106, the handover message may also include the mapped QoS parameters from both the source RAN 104 and the target RAN 106, which includes the used or dynamic UE-AMBRs and the APN-AMBR.

At event 514a and 514b, PDP context requests and responses are exchanged between the target MME 106a and the target serving gateway 110, and the relocation is forwarded from the target MME 106a to the source SGSN gateway 104d at event 516. Bearer request(s) and response(s) are then exchanged between the source SGSN gateway 104d and the serving source gateway 108 at event 518a and 518b.

Figure 6:
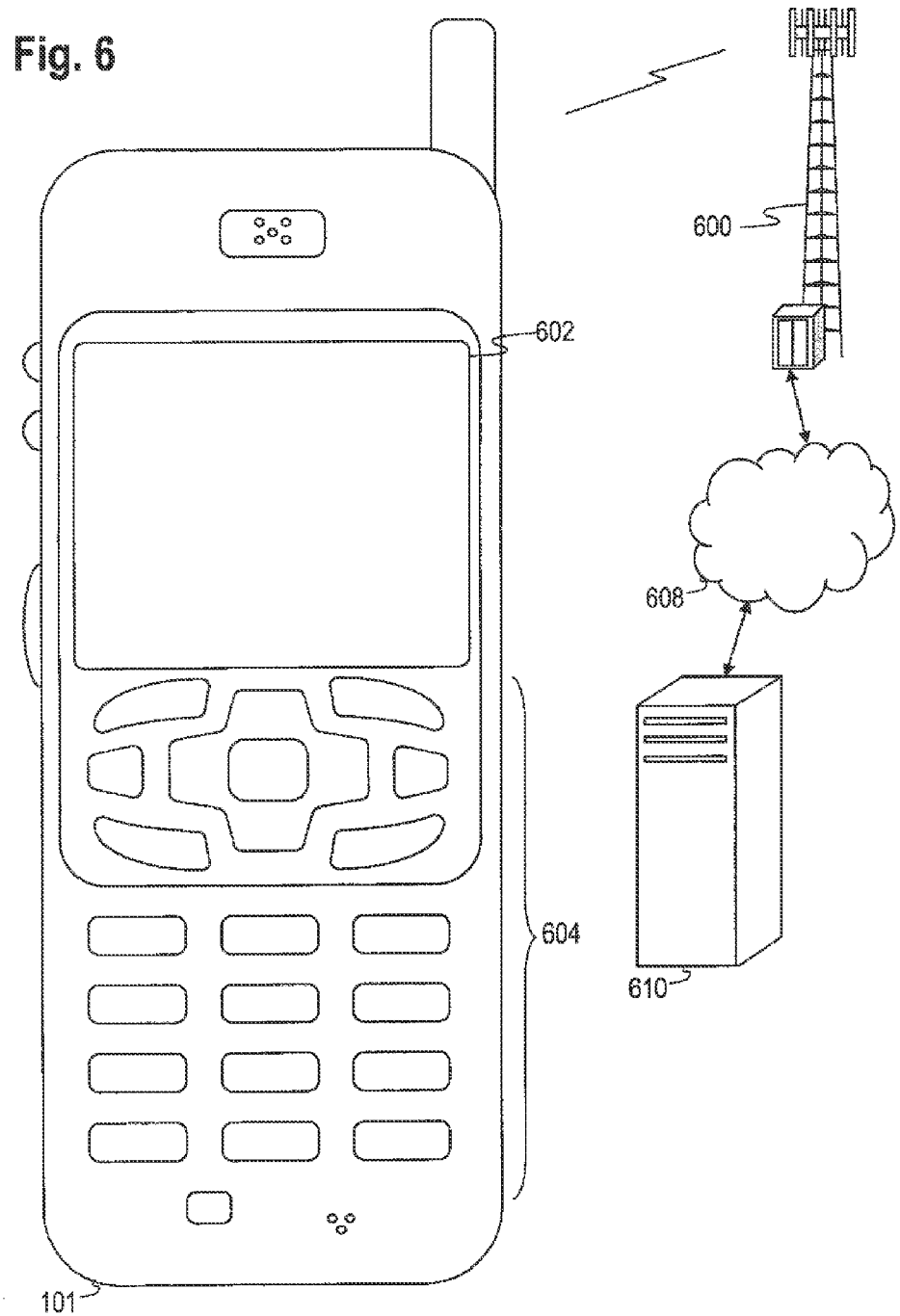
FIG. 6 is a diagram of a wireless communications system including a user agent operable for some of the various embodiments of the disclosure.

FIG. 6 illustrates a wireless communications system including an embodiment of the UA 101. The UA 101 is operable for implementing aspects of the disclosure, but the disclosure should not be limited to these implementations. Though illustrated as a mobile phone, the UA 101 may take various forms including a wireless handset, a pager, a personal digital assistant (PDA), a portable computer, a tablet computer, or a laptop computer. Many suitable devices combine some or all of these functions. In some embodiments of the disclosure, the UA 101 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 101 may be a portable, laptop or other computing device. The UA 101 may support specialized activities such as gaming, inventory control, job control, and/or task management functions, and so on.

The UA 101 includes a display 602. The UA 101 also includes a touch-sensitive surface, a keyboard or other input keys generally referred as 604 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 101 may present options for the user to select, controls for the user to actuate, and/or cursors or other indicators for the user to direct.

The UA 101 may further accept data entry from the user, including numbers to dial or various parameter values for configuring the operation of the UA 101. The UA 101 may further execute one or more software or firmware applications in response to user commands. These applications may configure the UA 101 to perform various customized functions in response to user interaction. Additionally, the UA 101 may be programmed and/or configured over-the-air, for example from a wireless base station, a wireless access point, or a peer UA 101.

Among the various applications executable by the UA 101 are a web browser, which enables the display 602 to show a web page. The web page may be obtained via wireless communications with a wireless network access node, a cell tower, a peer UA 101, or any other wireless communication network or system 600. The network 600 is coupled to a wired network 608, such as the Internet. Via the wireless link and the wired network, the UA 101 has access to information on various servers, such as a server 610. The server 610 may provide content that may be shown on the display 602. Alternately, the UA 101 may access the network 600 through a peer UA 101 acting as an intermediary, in a relay type or hop type of connection.

FIG. 7 shows a block diagram of the UA 101. While a variety of known components of UAs 101 are depicted, in an embodiment a subset of the listed components and/or additional components not listed may be included in the UA 101. The UA 101 includes a digital signal processor (DSP) 702 and a memory 704. As shown, the UA 101 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, a short range wireless communication sub-system 724, an alert 726, a keypad 728, a liquid crystal display (LCD), which may include a touch sensitive surface 730, an LCD controller 732, a charge-coupled device (CCD) camera 734, a camera controller 736, and a global positioning system (GPS) sensor 738. In an embodiment, the UA 101 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the UA 101 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the UA 101 to send and receive information from a cellular network or some other available wireless communications network or from a peer UA 101. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF Transceiver 708, portions of the Antenna and Front End 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset 716 and outputs to the earpiece 714 and the headset 716. To that end, the analog baseband processing unit 710 may have ports for connecting to the built-in microphone 712 and the earpiece speaker 714 that enable the UA 101 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the DSP 702 or by other central processing units.

The DSP 702 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 702 may perform modulation, coding, interleaving, and spreading, and for a receiver function the DSP 702 may perform despreading, deinterleaving, decoding, and demodulation. In another embodiment, for example in an orthogonal frequency division multiplex access (OFDMA) technology application, for the transmitter function the DSP 702 may perform modulation, coding, interleaving, inverse fast Fourier transforming, and cyclic prefix appending, and for a receiver function the DSP 702 may perform cyclic prefix removal, fast Fourier transforming, deinterleaving, decoding, and demodulation. In other wireless technology applications, yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB interface 722 and the short range wireless communication sub-system 724. The USB interface 522 may be used to charge the UA 101 and may also enable the UA 101 to function as a peripheral device to exchange information with a personal computer or other computer system. The short range wireless communication sub-system 724 may include an infrared port, a Bluetooth interface, an IEEE 802.11 compliant wireless interface, or any other short range wireless communication sub-system, which may enable the UA 101 to communicate wirelessly with other nearby mobile devices and/or wireless base stations.

The input/output interface 718 may further connect the DSP 702 to the alert 726 that, when triggered, causes the UA 101 to provide a notice to the user, for example, by ringing, playing a melody, or vibrating. The alert 726 may serve as a mechanism for alerting the user to any of various events such as an incoming call, a new text message, and an appointment reminder by silently vibrating, or by playing a specific pre-assigned melody for a particular caller.

The keypad 728 couples to the DSP 702 via the interface 718 to provide one mechanism for the user to make selections, enter information, and otherwise provide input to the UA 101. The keyboard 728 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 730, which may include touch screen capability and also display text and/or graphics to the user. The LCD controller 732 couples the DSP 702 to the LCD 730.

The CCD camera 734, if equipped, enables the UA 101 to take digital pictures. The DSP 702 communicates with the CCD camera 734 via the camera controller 736. In another embodiment, a camera operating according to a technology other than Charge Coupled Device cameras may be employed. The GPS sensor 738 is coupled to the DSP 702 to decode global positioning system signals, thereby enabling the UA 101 to determine its position. Various other peripherals may also be included to provide additional functions, e.g., radio and television reception.

FIG. 8 illustrates a software environment 802 that may be implemented by the DSP 702. The DSP 702 executes operating system drivers 804 that provide a platform from which the rest of the software operates. The operating system drivers 804 provide drivers for the UA hardware with standardized interfaces that are accessible to application software. The operating system drivers 804 include application management services ("AMS") 806 that transfer control between applications running on the UA 101. Also shown in FIG. 8 are a web browser application 808, a media player application 810, and Java applets 812. The web browser application 808 configures the UA 101 to operate as a web browser, allowing a user to enter information into forms and select links to retrieve and view web pages. The media player application 810 configures the UA 101 to retrieve and play audio or audiovisual media. The Java applets 812 configure the UA 101 to provide games, utilities, and other functionality. A component 814 might provide functionality described herein. Although shown at an application layer, the component 814 might be provided at various layers within the environment 802 or elsewhere on the UA 101.

Figure 9:
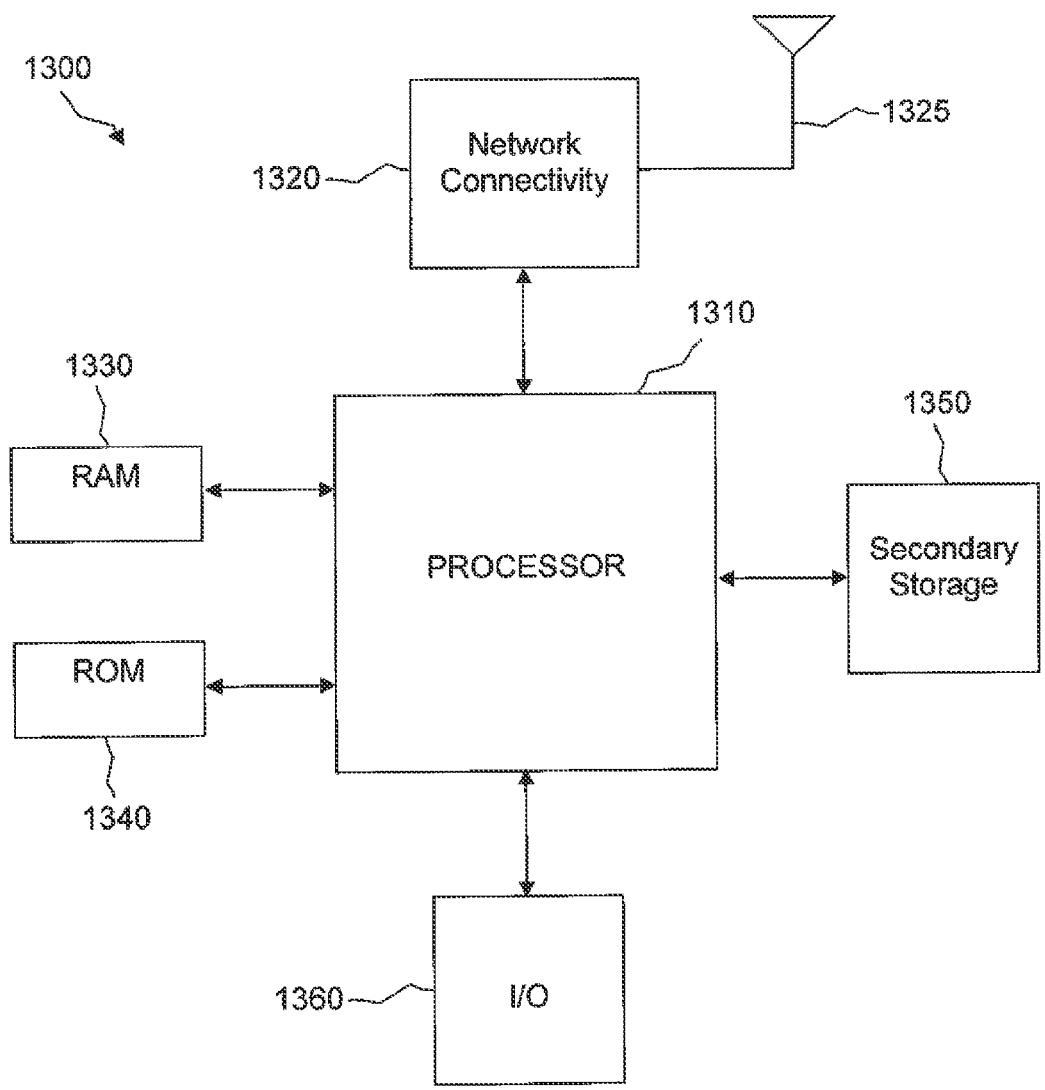
FIG. 9 illustrates an exemplary general-purpose computer system suitable for implementing the several embodiments of the present disclosure.

The UA 101 and other components described above might include a processing component that is capable of executing instructions related to the actions described above. FIG. 9 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 101, such as the display 602 and the input 604.

The following is an alternative embodiment of the disclosure.

Introduction

This paper discusses the non-GBR dynamic UE-AMBR and APN-AMBR handling for 3GPP Inter-RAT handover cases.

Discussion

In SA2#65, the dynamic (or the used) per UE-AMBR has been agreed for per UE UL and DL non-GBR enforcement at the eNodeB. The used UE-AMBR takes the sum of the APN-AMBRs of the active APNs and it shall be updated by the MME (it could be updated by the eNodeB too). At SA2 #65, the changes to several of the impacted procedures have been also proposed and agreed for the used UE-AMBR handling together with non-GBR QoS enforcement using both the per UE-AMBR and the per APN AMBR[1]. However the eUTRAN handover cases w.r.t. (with respect to) the AMBR updates for 3GPP accesses have not been specified.

Case 1: Intra-eUTRAN (Inter-eNodeB) Handover

It shall not be an issue for Intra-eUTRAN (or inter-eNodeB) handover. The source eNodeB can send the UE's QoS information to the target eNodeB via the X-2 interface. Whether the UE is handed over to a new MME or staying in the same MME, the MME shall have the UE's profile with the AMBR subscriptions and the active APN information for the used (or dynamic) AMBR updates.

Case 2: eURAN to UTRAN/GERAN Inter-RAT Handover

For the case of eUTRAN to UTRAN/GERAN Inter-RAT handover, the UE shall be handed over from an eNodeB to a RNC or BSC and from a MME to a SGSN. As UTRAN and GERAN do not support AMBR, for the non-GBR bearers, QoS mapping from the AMBR of rel. 8 to MBRs of rel. 7 is needed. Notice that since there are two types of AMBR defined: UE-AMBR and APN AMBR, the APN-AMBR of the default APN used in the eUTRAN shall be mapped to the MBRs used in the UTRAN/GERAN. As AMBR is the aggregated bit rate for all the active non-GBRs connecting to the default APN, the mapped MBR shall be set to MBR=APN-AMBR/N, or it can be also the sum of MBRs with various values=APN-AMBR, where N is the active non-GBRs connecting to the default APN. Notice that the source eUTRAN may have connected to multiple-PDNs before the handover. For the target UTRAN/GERAN only support the multiple-PDN connectivity [3], only the connections to the default APN shall be connected to UTRAN/GERAN during handover.

Propose 1: AMBR Mapping for eUTRAN to UTRAN/GERAN Inter-RAT Handover. For each of the active APNs connected, the MBR for each of the active non-GBRs used in the target UTRAN/GERAN shall be set to MBR=used APN-AMBR/N, or sum of MBRs with various values=used APN-AMBR; where N is the active non-GBRs for the APN and the used APN-AMBR can be the subscribed APN-AMBR or a modified APN-AMBR for the active APN.

Propose 2: IF the target UTRAN/GERAN does not support multiple PDN connectivity, in the eURAN to UTRAN/GERAN Inter-RAT handover preparation, only the QoS mapping for the default APN shall be implemented and only the connections to the default APN shall be connected to the target UTRAN/GERAN.

Case 3: UTRAN/GERAN to eUTRAN Inter-RAT handover: For the case of UTRAN/GERAN to eUTRAN handover, the UE shall be handed over from RNC or BSC and from a SGSN to an eNodeB. Note that for each active APN connected the eUTRAN requires both the UE AMBR and the associated APN-AMBRs in order for non-GBR QoS enforcement. These two type AMBRs can be set during the UTRAN/GERAN to eUTRAN Inter-RAT handover preparation phase according to: APN-AMBR of each active APN=sum of MBRs of the active non-GBRs of the APN and UE-AMBR=sum of MBRs of all the active non-GBRs in UTRAN/GERAN. In the handover execution phase, the UE-AMBR and APN-AMBR shall be updated from accessing the HSS (via location/tracking area updates).

Propose 3: AMBR Mapping for UTRAN/GERAN to eUTRAN inter-RAT handover. The APN-AMBRs and the UE-AMBR used by the target eUTRAN during the Inter-RAT handover preparation phase shall be set according to: APN-AMBR of each active APN=sum of MBRs of the active non-GBRs in that APN; and UE-AMBR=sum of MBRs of all the active non-GBRs in the source UTRAN/GERAN. The UE-AMBR and APN-AMBRs used by the eNodeB, the PDN GWs shall be updated by the MME (or the eNodeB or some other NE) based on the subscribed UE-AMBR and APN-AMBRs from accessing the HSS in the handover execution phase.

3GPP Access I-RAT Handover Procedure Enhancement for AMBR Handling. Propose 4: 3GPP Access Inter-RAT handover procedure enhancements for non-GBR AMBR handling. To support the proposals 1-3, the procedures for 3GPP Access eUTRAN I-RAT handover shall be enhanced.

Figure 10:
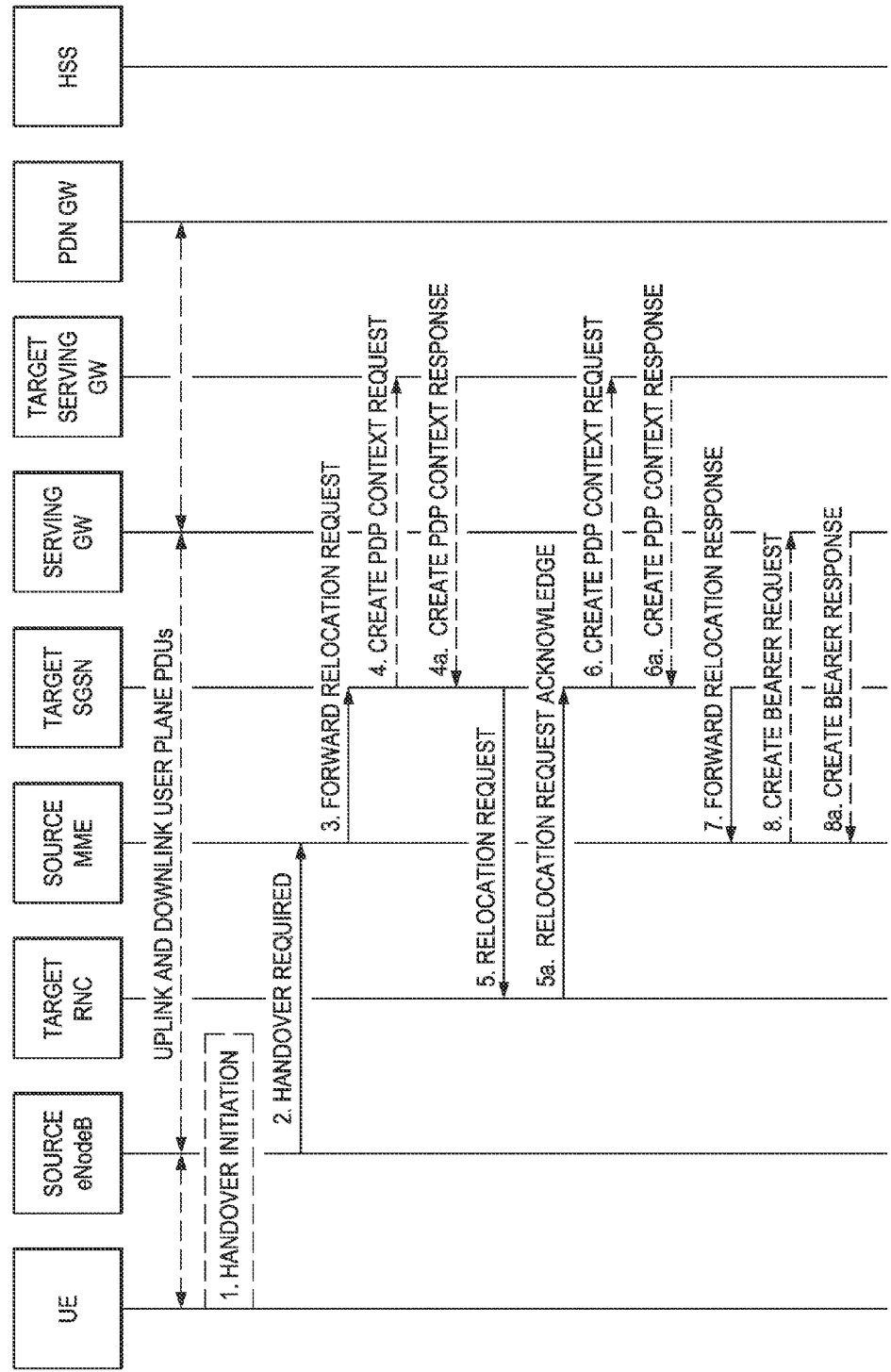
FIG. 10 is a flow diagram showing an example EUTRAN to UTRAN handover preparation process flow.

Procedure 1. EUTRAN to UTRAN Handover Preparation. FIG. 10 is a flow diagram showing an example EUTRAN to UTRAN handover preparation process flow.

Step 3:

The source MME maps the EPS bearers to PDP contexts 1-to-1 and maps the EPS QoS parameter values of an EPS bearer to the pre-Rel-8 QoS parameter values of a PDP context as defined in Annex E. The PDP Contexts shall be sent in a prioritized order, i.e. the most important PDP Context first. The prioritization method is implementation dependent, but should be based on the current activity. If multiple PDN connectivity is supported in the target UTRAN, for each active APN, all the bearer connections shall be connected to the target UTRAN. For each of the active non-GBR bearers in the APN, MBRs used in the target SGSN/Target RNC shall be set according to: MBR=used APN-AMBR/N, where N is the active non-GBRs in the APN, or the MBRs can have different values such that sum MBRs=used APN-AMBR and used APN-AMBR can be the subscribed APN-AMBR or its modification. If multiple PDN connectivity is not supported in the target UTRAN, only the default APN bearer connections shall be connected to the target UTRAN.

Figure 11:
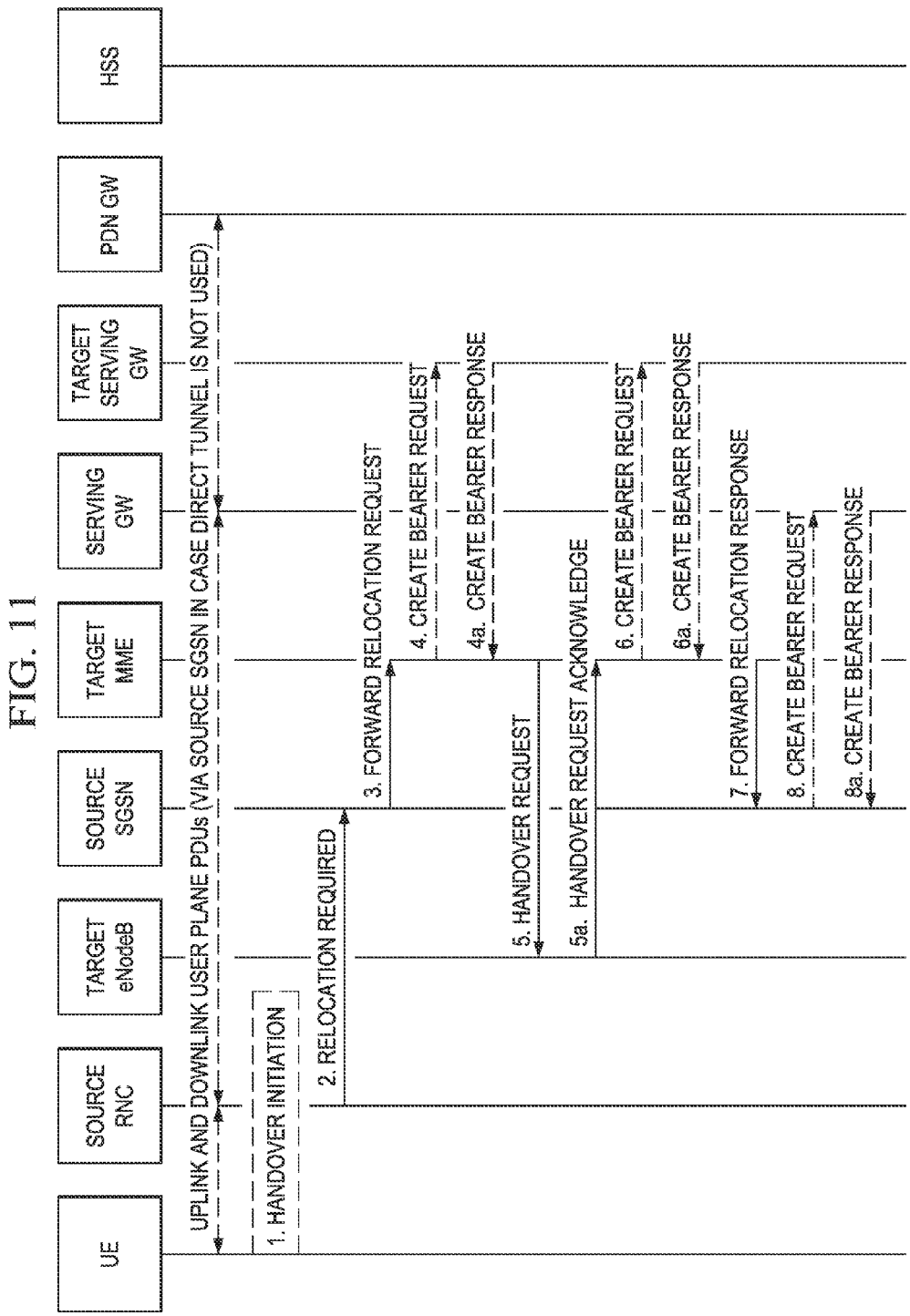
FIG. 11 is a flow diagram showing an example UTRAN iu mode to EUTRAN inter-RAT handover preparation process flow.

Procedure 2: UTRAN Iu mode to E-UTRAN Inter RAT handover Preparation. FIG. 11 is a flow diagram showing an example UTRAN iu mode to EUTRAN inter-RAT handover preparation process flow.

Step 3:

The target MME maps the PDP contexts to the EPS bearers 1-to-1 and maps the pre-Rel-8 QoS parameter values of a PDP context to the EPS QoS parameter values of an EPS bearer as defined in Annex E. The MME establishes the EPS bearer(s) in the indicated order. The MME deactivates the EPS bearers which cannot be established. The target eNodeB requires both UE-AMBR and the APN-AMBR for non-GBR QoS enforcement. These two AMBRs shall be set according to: APN-AMBR of each active APN=sum MBR of the active non-GBRs, and UE-AMBR=sum of MBRs of all the active non-GBRs in the source UTRAN.

Step 5:

The target MME requests the target eNodeB to establish the bearer(s) by sending the message Handover Request (UE Identifier, Cause, KeNB, allowed AS Integrity Protection and Ciphering algorithm(s), NAS Integrity Protection and Ciphering algorithm(s), EPS Bearers to be setup list, Source to Target Transparent Container). NAS Integrity Protection and Ciphering algorithm(s), KSI and key derivation parameters are targeted for the UE. For each APN to be connected to the target eUTRAN, the message shall also include the mapped QoS parameters from UTRAN to eUTRAN including the used UE-AMBR and the APN-AMBRs.

Figure 12:
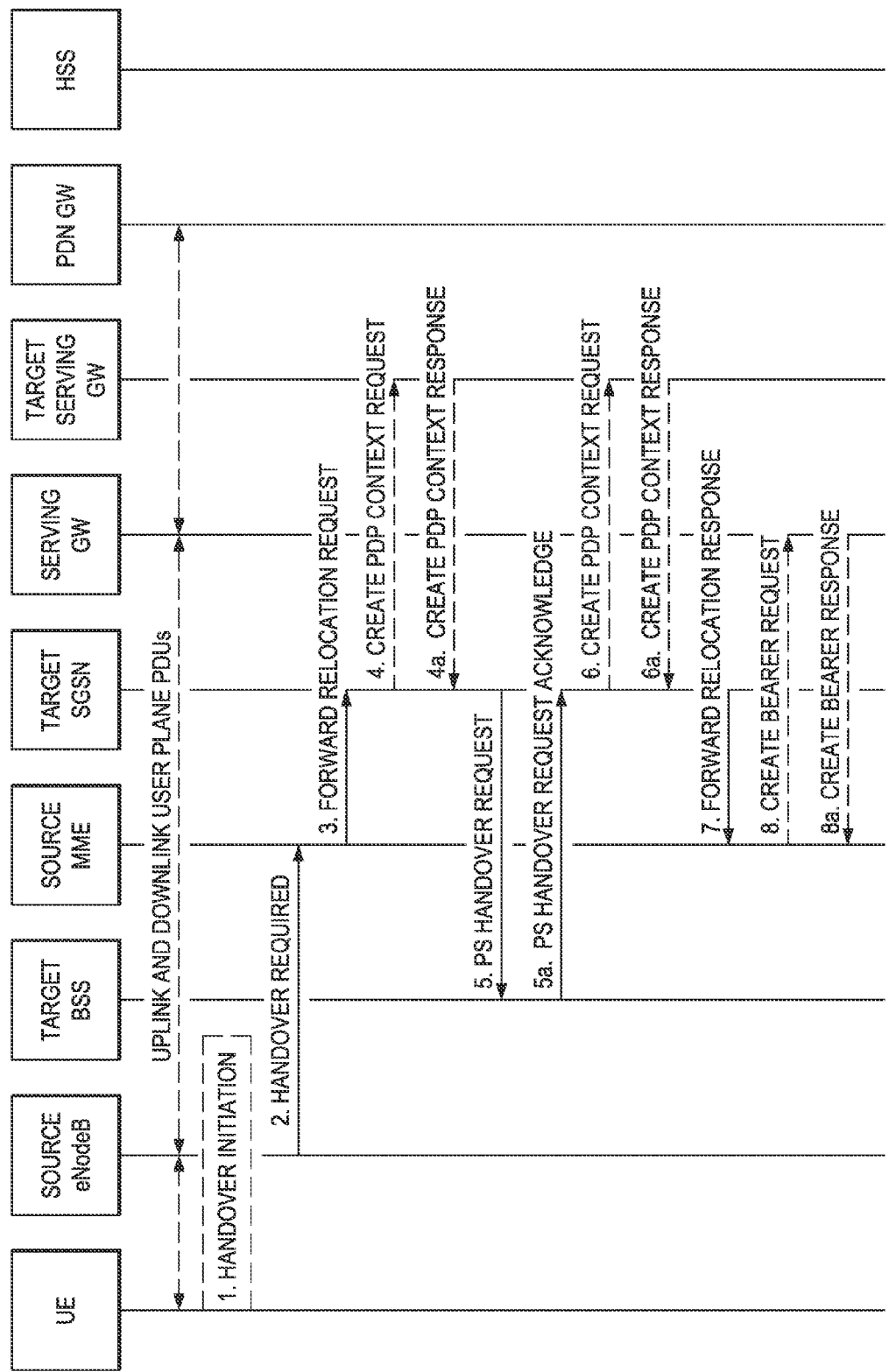
FIG. 12 is a flow diagram showing an example EUTRAN to GERAN A/Gb mode inter-RAT handover preparation process flow.

Procedure 3: E-UTRAN to GERAN A/Gb Mode Inter RAT Handover preparation. FIG. 12 is a flow diagram showing an example EUTRAN to GERAN A/Gb mode inter-RAT handover preparation process flow.

Step 3:

The source MME maps the EPS bearers to PDP contexts 1-to-1 and maps the EPS QoS parameter values of an EPS bearer to the pre-Rel-8 QoS parameter values of a PDP context as defined in Annex E. The PDP Contexts shall be sent in a prioritized order, i.e. the most important PDP Context first. The prioritization method is implementation dependent, but should be based on the current activity.

If multiple PDN connectivity is supported in the target GERAN, for each active APN, all the bearer connections shall be connected to the target GERAN. For each of the active non-GBR bearers in the APN, MBRs used in the target SGSN/Target RNC shall be set according to: MBR=used APN-AMBR/N, where N is the active non-GBRs in the APN, or the MBRs can have different values such that sum MBRs=used APN-AMBR and used APN-AMBR can be the subscribed APN-AMBR or its modification. If multiple PDN connectivity is not supported in the target GERAN, only the default APN bearer connections shall be connected to the target GERAN.

Figure 13:
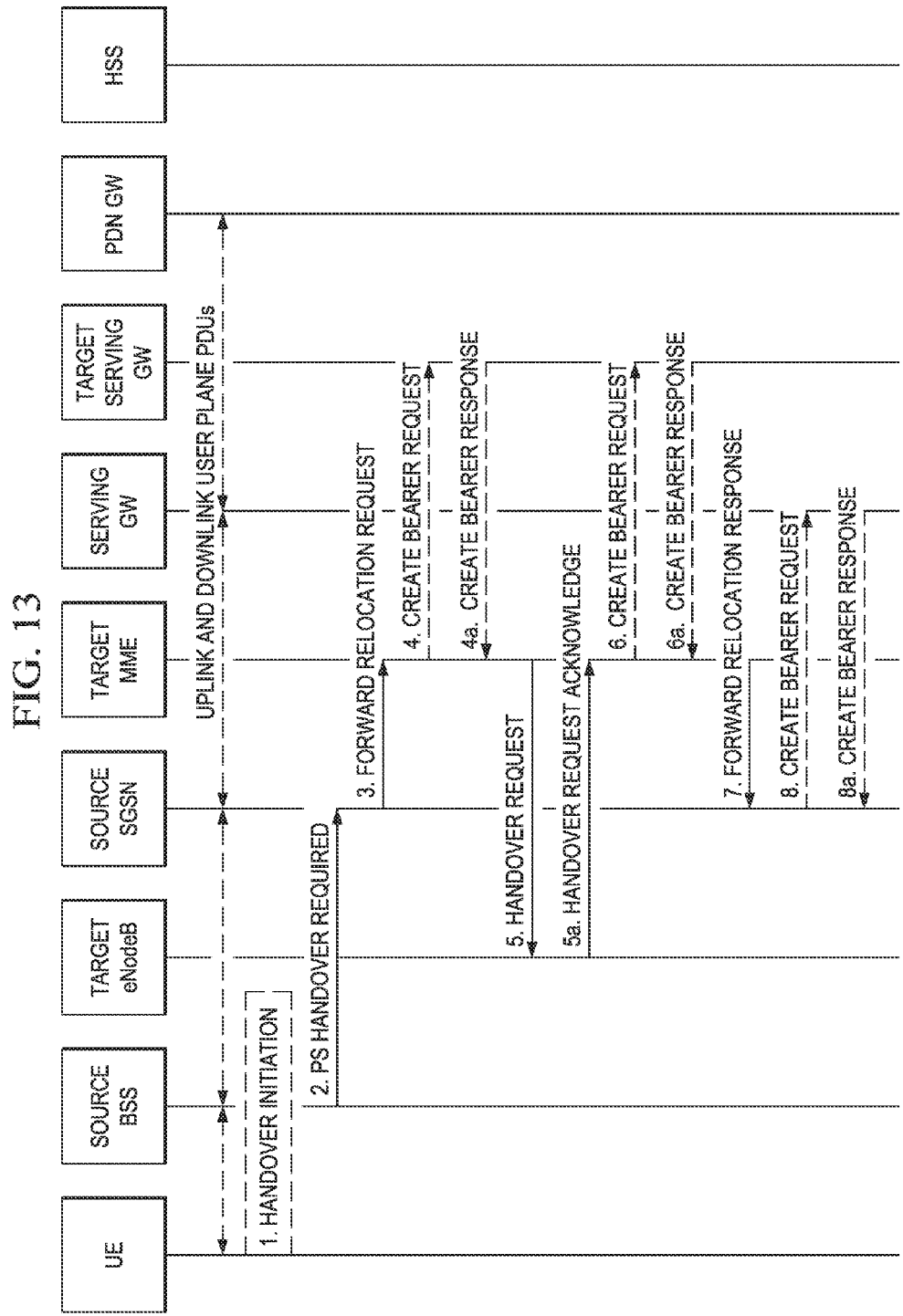
FIG. 13 is a flow diagram showing an example GERAN A/Gb mode to EUTRAN inter-RAT handover preparation process flow.

Procedure 4: GERAN A/Gb mode to E-UTRAN Inter RAT handover preparation. FIG. 13 is a flow diagram showing an example GERAN A/Gb mode to EUTRAN inter-RAT handover preparation process flow.

Step 3:

The 'Direct Forwarding Flag' IE indicates if Direct Forwarding of data to Target side shall be used or not. This flag is set by the source SGSN. The target MME maps the PDP contexts to the EPS bearers 1-to-1 and maps the pre-Rel-8 QoS parameter values of a PDP context to the EPS QoS parameter values of an EPS bearer as defined in Annex E. The MME establishes the EPS bearer(s) in the indicated order. The MME deactivates the EPS bearers which cannot be established. The target eNodeB requires both UE-AMBR and the APN-AMBR for non-GBR QoS enforcement. These two AMBRs shall be set according to: APN-AMBR of each active APN=sum MBR of the active non-GBRs, and UE-AMBR=sum of MBRs of all the active non-GBRs in the source GERAN.

Step 5:

The Target MME will request the Target eNodeB to establish the Bearer(s) by sending the message Handover Request (UE Identifier, Cause, Integrity protection information (i.e. IK and allowed Integrity Protection algorithms), Encryption information (i.e. CK and allowed Ciphering algorithms), EPS Bearers to be setup list, Source to Target Transparent Container). The Target MME shall not request resources for which the Activity Status Indicator within a PDP Context indicates that no active bearer exists on the source side for that PDP Context. For each EPS bearer requested to be established, 'EPS Bearers To Be Setup' IE shall contain information such as ID, bearer parameters, Transport Layer Address, and S1 Transport Association. The Transport Layer Address is the Serving GW Address for user data, and the S1 Transport Association corresponds to the uplink Tunnel Endpoint Identifier Data. The ciphering and integrity protection keys will be sent transparently from the target eNodeB to the UE in the Target to Source Transparent Container, and in the message PS Handover Command from source BSS to the UE. This will then allow data transfer to continue in the new RAT/mode target cell without requiring a new AKA (Authentication and Key Agreement) procedure. For each APN to be connected to the target eUTRAN, the message shall also include the mapped QoS parameters from GERAN to eUTRAN including the used UE-AMBR and the APN-AMBRs.

QoS Mapping Standard Enhancement on Specs

Annex E (normative):Mapping between EPS and pre-Rel-8 QoS parameters

This annex specifies how the QoS parameter values of an EPS bearer (E-UTRAN access to the EPS) should be mapped to/from the pre-Rel-8 QoS parameter values of a PDP context (UTRAN/GERAN access to the EPS) before a procedure is triggered that executes a handover between E-UTRAN and UTRAN/GERAN. The following mapping rules hold:

There is a one-to-one mapping between an EPS bearer and a PDP context.

The handling of this principle in case of "dual stack IPv4/ IPv6 bearers" is FSS.

The EPS bearer parameters ARP is mapped one-to-one to/from the pre-Rel-8 bearer parameter ARP.

Note that in GPRS pre-Rel-8 the same UE/PDN connection, the system does not expect to have two or more PDP contexts with different ARP values. This is different in EPS. It is FFS whether this causes conflict/errors or whether a specific mapping rule for ARP is needed.

The EPS bearer parameters GBR and MBR of a GBR EPS bearer are mapped one-to-one to/from the pre-Rel-8 bearer parameters GBR and MBR of a PDP context associated with Traffic class 'conversational' or 'streaming'.

The details of the mapping of GBR, and MBR between GBR EPS bearers and conversational/streaming PDP contexts are captured in stage 3 specs.

At handover from E-UTRAN to UTRAN/GERAN the pre-Rel-8 bearer parameter MBR of PDP contexts associated with Traffic Class 'interactive' or 'background' is set based on MME operator policy.

In order to apply the concept of AMBRs in UTRAN/GE-RAN, for each active APN, one such policy may be to set the sum of those MBRs to not exceed the value of the EPS bearer parameter used APN-AMBR. In the case that the handover involves M-PDN connections and the target UTRAN/GE-RAN does not support M-PDN connectivity, only the connections to the default APN shall be connected to the target UTRAN/GERAN and only the used APN_AMBR of the default APN need to be converted to MBRs.

In order to ensure that the MBR of PDP contexts associated with Traffic Class 'interactive' or 'background' are restored to their previous values when handing over again from E-UT-RAN to UTRAN/GERAN, one such policy may be to have an MME store at handover from UTRAN/GERAN to E-UT-RAN the pre-Rel-8 bearer parameter MBR of PDP contexts associated with Traffic Class 'interactive' or 'background'.

At handover from UTRAN/GERAN to E-UTRAN the AMBRs from the EPS subscribed QoS profile for the corresponding APN shall take precedence. In case of handover from a pre-Rel8 SGSN and if the MME has no subscribed AMBR values for the UE, the MME provides a local UE-AMBR and local APN-AMBR (APN-AMBRs if it is a M-PDN connection handover) to the eNodeB, the local APN-AMBRs to the Serving GW and the PDNGWs until the MME gets the EPS subscribed AMBRs. This the local UE-AMBR may be for example based on the summing up of pre-Rel-8 bearer parameter MBR of all the interactive/background PDP contexts of all the active APNs or on internal configuration. Each local APN-AMBR may be for example based on the summing up of pre-Rel-8 bearer parameter MBR of all the interactive/background PDP contexts of that active APN or on internal configuration. When the MME gets the subscribed UE-AMBR and APN-AMBR values from the HSS, it calculate the used UE-AMBR (UE-AMBR=MIN(subscribed UE-AMBR, sum APN-AMBR of all active APNs) and possibly set the used APN-AMBRs if the used UE-AMBR is smaller than the subscribed UE-AMBR. Then it compares these values with the local AMBRs and if any of the local AMBRs are different from the corresponding subscribed (or used) AMBRs, the MME initiates HSS Initiated Subscribed QoS Modification procedure to notify the used UE-AMBR and the APN-AMBRs (or used APN-AMBRs) to the eNodeB, notify the subscribed APN-AMBRs (or used APN-AMBRs) to the Serving GW and PDNGWs.

Handling of AMBR in case of handover from Rel8 SGSN is FFS.

standardized value of the EPS bearer parameter QCI is mapped one-to-one to/from values of the pre-Rel-8 parameters Traffic Class, Traffic Handling Priority, Signalling Indication, and Source Statistics Descriptor as shown in Table E-1.

At handover from E-UTRAN to UTRAN/GERAN the setting of the values of the pre-Rel-8 parameters Transfer Delay and SDU Error Ratio should be derived from the corresponding QCI's Packet Delay Budget and Packet Loss Rate, respectively. At handover from UTRAN/GE-RAN to E-UTRAN the values of the pre-Rel-8 parameters Transfer Delay and SDU Error Ratio should be ignored.

The setting of the values of all other pre-Rel-8 QoS is based on operator policy pre-configured in the MME.

TABLE E-1

Mapping between standardized QCIs and pre-Rel-8 QoS parameter values

| QCI | Traffic Class | Traffic Handling Priority | Signalling Indication | Source Statistics Descriptor |
|---|---|---|---|---|
| 1 | Conversational | N/A | N/A | Speech |
| 2 | Conversational | N/A | N/A | Unknown |
| FFS | Streaming | N/A | N/A | Speech |

TABLE E-1-continued

Mapping between standardized QCIs
and pre-Rel-8 QoS parameter values

| QCI | Traffic Class | Traffic Handling Priority | Signaling Indication | Source Statistics Descriptor |
|---|---|---|---|---|
| 3 | Streaming | N/A | N/A | Unknown |
| 5 | Interactive | 1 | Yes | N/A |
| 7 | Interactive | 1 | No | N/A |
| 6 | Interactive | 2 | No | N/A |
| 8 | Interactive | 3 | No | N/A |
| 9 | Background | N/A | N/A | N/A |

The mapping of QCI 4 is FFS.

Conclusion And Summary

AMBR Mapping for eUTRAN to UTRAN/GERAN Inter-RAT Handover.

For each of the active APNs connected, the MBR For each of the active non-GBRs used in the target UTRAN/GERAN shall be set to MBR=used APN-AMBR/N, or sum of MBRs with various values=used APN-AMBR; where N is the active non-GBRs for the APN and the used APN-AMBR can be the subscribed APN-AMBR or a modified APN-AMBR for the active APN.

Propose 2: IF the target UTRAN/GERAN does not support multiple PDN connectivity, in the eURAN to UTRAN/GERAN Inter-RAT handover preparation.

Only the QoS mapping for the default APN shall be implemented and only the connections to the default APN shall be connected to the target UTRAN/GERAN.

Propose 3: AMBR Mapping for UTRAN/GERAN to eUTRAN inter-RAT handover.

The APN-AMBRs and the UE-AMBR used by the target eUTRAN during the Inter-RAT handover preparation phase shall be set according to: APN-AMBR of each active APN=sum of MBRs of the active non-GBRs in that APN; and UE-AMBR=sum of MBRs of all the active non-GBRs in the source UTRAN/GERAN. The UE-AMBR and APN-AMBRs used by the eNodeB, the PDN GWs shall be updated by the MME (or the eNodeB or some other NE) based on the subscribed UE-AMBR and APN-AMBRs from accessing the HSS in the handover execution phase.

Propose 4: 3GPP Access Inter-RAT handover procedure enhancements for non-GBR AMBR handling.

To support the proposals 1-3, the procedures for 3GPP Access eUTRAN I-RAT handover shall be enhanced.

The following 3rd Generation Partnership Project (3GPP) Technical Specifications (TS) are incorporated herein by reference: TS 36.321, TS 36.331, TS 36.300, TS 23.401, TS 23.402, S2-084350, and TS 23.236. 3GPP S2-084350, per UE AMBR, 2008-5; 3GPP TS23.401 v8.1.0, 2008-3; 3GPP TS23.236 Intra-domain connection of RAN notes to multiple CN nodes, v7.0.0 2006-12.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for quality of service (QoS) parameters mapping during a handover from a first radio access network (RAN) to a second RAN, the first RAN and the second RAN having communication with one or more access point names (APNs), comprising:

deriving, for the second RAN, an APN aggregated maximum bit rate (APN-AMBR) for each of the one or more APNs based on a maximum bit rate (MBR) of one or more packet data protocol (PDP) contexts of the first RAN, the first RAN including one of a universal terrestrial radio access network (UTRAN) or a global system for mobiles (GSM) enhanced data for GSM evolution radio access network (GERAN) and the second RAN including an evolved universal terrestrial radio access network (E-UTRAN).

2. The method of claim 1, further comprising providing a local user equipment (UE) aggregated maximum bit rate (UE-AMBR) until a subscribed UE-AMBR is available for the UE.

3. The method of claim 2, further comprising:
acquiring the subscribed UE-AMBR;
calculating a derived UE-AMBR; and
comparing the derived UE-AMBR to the local UE-AMBR.

4. The method of claim 3, wherein calculating a derived UE-AMBR comprises taking the minimum of the subscribed UE-AMBR and the sum of the derived APN-AMBRs of the one or more APNs associated with the UE.

5. The method of claim 2, wherein the local UE-AMBR is based on a sum of the one or more derived APN-AMBR.

6. The method of claim 3 further comprising notifying the derived UE-AMBR to the second RAN by initiating a subscribed quality of service (QoS) modification procedure.

7. The method of claim 6, wherein the notification of the derived UE-AMBR is a first notification and the subscribed QoS modification procedure further provides a second notification of a subscribed APN-AMBR, and wherein the first notification is provided to an enhanced node-B (eNB) of the second RAN and the second notification is provided to a serving gateway and packet data network gateway.

8. The method of claim 6, wherein the subscribed QoS modification procedure is initiated if the local UE-AMBR is different from the derived UE-AMBR.

9. A device configured to provide quality of service (QoS) parameters mapping during a handover from a first radio access network (RAN) to a second RAN, the first RAN and the second RAN having communication with one or more access point names (APNs), the device comprising:

one or more hardware processors configured to:
derive, for the second RAN, an APN aggregated maximum bit rate (APN-AMBR) for each of the one or more APNs based on a maximum bit rate (MBR) of one or more packet data protocol (PDP) contexts of the first RAN, the first RAN including one of a universal terrestrial radio access network (UTRAN) or a global system for mobiles (GSM) enhanced data for GSM evolution radio access network (GERAN) and the second RAN including an evolved universal terrestrial radio access network (E-UTRAN).

10. The device of claim 9, wherein the one or more hardware processors are further configured to provide a local user equipment (UE) aggregated maximum bit rate (UE-AMBR) until a subscribed UE-AMBR is available for the UE.

11. The device of claim 10, wherein the one or more hardware processors are further configured to:
acquire the subscribed UE-AMBR;
calculate a derived UE-AMBR; and
compare the derived UE-AMBR to the local UE-AMBR.

12. The device of claim 11, wherein calculating a derived UE-AMBR comprises taking the minimum of the subscribed UE-AMBR and the sum of the derived APN-AMBRs of the one or more APNs associated with the UE.

13. The device of claim 10, wherein the local UE-AMBR is based on a sum of the one or more derived APN-AMBR.

14. The device of claim 11, the one or more hardware processors are further configured to the notify the derived UE-AMBR to the second RAN by initiating a subscribed quality of service (QoS) modification procedure.

15. The device of claim 14, wherein the notification of the derived UE-AMBR is a first notification and the subscribed QoS modification procedure further provides a second notification of a subscribed APN-AMBR, and wherein the first notification is provided to an enhanced node-B (eNB) of the second RAN and the second notification is provided to a serving gateway and packet data network gateway.

16. The device of claim 14, wherein the subscribed QoS modification procedure is initiated if the local UE-AMBR is different from the derived UE-AMBR.

* * * * *

UNITED STATES PATENT AND TRADEMARK OFFICE
CERTIFICATE OF CORRECTION

PATENT NO. : 8,787,316 B2
APPLICATION NO. : 13/336798
DATED : July 22, 2014
INVENTOR(S) : Xiaoming Zhao et al.

Page 1 of 1

It is certified that error appears in the above-identified patent and that said Letters Patent is hereby corrected as shown below:

In the Claims

In Column 23, Line 17, Claim 14, after "to" delete "the".

Signed and Sealed this
Twenty-first Day of October, 2014

Michelle K. Lee
*Deputy Director of the United States Patent and Trademark Office*